US007756603B1

(12) United States Patent
Delaney, III et al.

(10) Patent No.: US 7,756,603 B1
(45) Date of Patent: Jul. 13, 2010

(54) SYSTEM AND METHODOLOGY PROVIDING COORDINATED AND MODULAR CONVEYOR ZONE CONTROL

(75) Inventors: Patrick J. Delaney, III, Sudbury, MA (US); Barbara Janina Byczkiewicz, Atkinson, NH (US); Anatoly G. Grinberg, Brighton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 22 days.

(21) Appl. No.: 11/279,604

(22) Filed: Apr. 13, 2006

Related U.S. Application Data

(60) Continuation of application No. 10/968,313, filed on Oct. 19, 2004, which is a division of application No. 10/219,126, filed on Aug. 15, 2002, now Pat. No. 6,848,933.

(60) Provisional application No. 60/356,485, filed on Nov. 13, 2001.

(51) Int. Cl.
*G06F 7/00* (2006.01)

(52) U.S. Cl. ..................... 700/230; 700/112; 198/459.8

(58) Field of Classification Search ................. 700/230, 700/112, 228, 229; 198/459.8, 460.1, 464.1–464.3, 198/571, 572, 575–577, 579
See application file for complete search history.

(56) References Cited

U.S. PATENT DOCUMENTS

| | | | | |
|---|---|---|---|---|
| 3,835,444 | A | | 9/1974 | Plana et al. |
| 3,960,262 | A | | 6/1976 | Henig |
| 4,284,316 | A | | 8/1981 | Debaigt |
| 4,444,447 | A | | 4/1984 | Markwardt |
| 5,037,308 | A | | 8/1991 | Bryce et al. |
| 5,044,964 | A | | 9/1991 | Minerd et al. |
| 5,058,727 | A | * | 10/1991 | Jahns et al. .............. 198/460.1 |
| 5,064,380 | A | | 11/1991 | Dale et al. |
| 5,186,308 | A | * | 2/1993 | Munro ....................... 198/572 |
| 5,228,558 | A | * | 7/1993 | Hall ........................... 198/784 |
| 5,285,887 | A | * | 2/1994 | Hall ........................ 198/460.1 |
| 5,415,556 | A | | 5/1995 | Schroll |
| 5,509,812 | A | | 4/1996 | Comerci et al. |
| 5,620,331 | A | | 4/1997 | Los et al. |
| 5,660,559 | A | | 8/1997 | Yamamoto et al. |
| 5,675,890 | A | | 10/1997 | Yamamoto et al. |
| 5,722,852 | A | | 3/1998 | Miek |
| 5,751,220 | A | * | 5/1998 | Ghaffari ................ 340/825.21 |
| 5,842,555 | A | * | 12/1998 | Gannon et al. ............. 198/358 |

(Continued)

OTHER PUBLICATIONS

OA dated Jul. 23, 2009 for U.S. Appl. No. 10/968,313, 19 pages.

(Continued)

*Primary Examiner*—Gene Crawford
*Assistant Examiner*—Ramya Prakasam
(74) *Attorney, Agent, or Firm*—Turocy & Watson LLP; William R. Walbrun; John M. Miller

(57) ABSTRACT

The present invention relates to conveyor control system and methodology that may be operatively coupled with other such systems in order to implement a control strategy for a modular conveyor system. A module and/or series of modules are provided that clamp to a cable, the modules having associated logic and inter-module communications for control. This includes relatively inexpensive power distribution, interconnection and motion logic for industrial conveyor systems.

23 Claims, 32 Drawing Sheets

U.S. PATENT DOCUMENTS

| | | | | |
|---|---|---|---|---|
| 5,862,907 | A * | 1/1999 | Taylor | 198/781.05 |
| 5,967,818 | A | 10/1999 | Carron et al. | |
| 6,021,888 | A * | 2/2000 | Itoh et al. | 198/783 |
| 6,047,812 | A * | 4/2000 | Horn et al. | 198/781.06 |
| 6,179,644 | B1 | 1/2001 | Adams et al. | |
| 6,193,054 | B1 * | 2/2001 | Henson et al. | 198/783 |
| 6,240,335 | B1 | 5/2001 | Wehrung et al. | |
| 6,253,906 | B1 * | 7/2001 | Hall | 198/460.1 |
| 6,302,266 | B1 | 10/2001 | DeFrancisco et al. | |
| 6,315,104 | B1 * | 11/2001 | Ebert | 198/460.1 |
| 6,328,592 | B1 | 12/2001 | Burke et al. | |
| 6,370,447 | B1 * | 4/2002 | Miyazaki | 700/230 |
| 6,460,683 | B1 * | 10/2002 | Pfeiffer | 198/460.1 |
| 6,487,091 | B2 | 11/2002 | Malkowski, Jr. et al. | |
| 6,522,944 | B2 * | 2/2003 | Wielebski et al. | 700/224 |
| 6,554,121 | B1 * | 4/2003 | Halbesma | 198/349 |
| 6,662,929 | B1 * | 12/2003 | Neary et al. | 198/460.1 |
| 6,669,012 | B1 * | 12/2003 | Yoshida et al. | 198/890 |
| 6,720,860 | B1 * | 4/2004 | Narayanaswami | 340/5.54 |
| 6,827,202 | B2 * | 12/2004 | Topmiller et al. | 198/781.05 |
| 6,842,433 | B2 * | 1/2005 | West et al. | 370/312 |
| 6,848,933 | B1 * | 2/2005 | Delaney et al. | 439/392 |
| 2006/0289274 | A1 * | 12/2006 | Knepple et al. | 198/460.1 |

OTHER PUBLICATIONS

OA dated Jun. 30, 2008 for U.S. Appl. No. 10/968,313, 22 pages.

OA dated Dec. 16, 2008 for U.S. Appl. No. 10/968,313, 13 pages.

* cited by examiner

TRANSPORT AND ACCUMULATION
AND JAM AND SLEEP COMMUNICATIONS COMBINED

BIDIRECTIONAL INTER-ZONE CONNECTION WAVEFORMS

SYSTEM AND METHODOLOGY PROVIDING COORDINATED AND MODULAR CONVEYOR ZONE CONTROL

CROSS-REFERENCE TO RELATED APPLICATION

This application is a continuation of U.S. patent application Ser. No. 10/968,313, filed on Oct. 19, 2004, entitled, "SYSTEM AND METHODOLOGY PROVIDING COORDINATED AND MODULAR CONVEYOR ZONE CONTROL," which is a divisional of U.S. patent application Ser. No. 10/219,126, filed on Aug. 15, 2002, entitled "SYSTEM AND METHODOLOGY PROVIDING COORDINATED AND MODULAR CONVEYOR ZONE CONTROL," now U.S. Pat. No. 6,848,933, which claims the benefit of U.S. Provisional Patent Application Ser. No. 60/356,485, filed on Nov. 13, 2001, entitled "SENSING SYSTEM AND METHOD." The entireties of the aforementioned patent applications are incorporated herein by reference.

TECHNICAL FIELD

The present invention relates generally to industrial control systems, and more particularly to a system and methodology to facilitate distributed and efficient control of a modular conveyor system.

BACKGROUND OF THE INVENTION

Control systems are often employed in association with conveyor systems for moving objects along guided tracks, including modular conveyor sections or "sticks". Conveyor systems for moving objects between stations in a manufacturing environment or for accumulating and distributing products in a warehouse operation are well known in the art. Such conveyor systems provide upwardly exposed conveying surfaces, such as rollers, positioned between guiding side rails. The rollers can be powered by controllable motors to move objects placed on top of the rollers along a track defined by the rails.

Assembly of conveyor systems can be facilitated by employment of "conveyor sticks" which may include one or more short sections of rollers and guide rails, which are connected together to form a final conveyor system. The conveying surface of each conveyor stick may be broken up into one or more zones, respective zones associated with a sensor for detecting the presence of an object on the conveyor at the zone. A control circuit communicates with the zones and associated sensors via a number of cables to control the zones, in order to accomplish a number of standardized tasks. Such conveyor systems may be adapted to perform one or more tasks or operations. One such task is that of "accumulation" in which a control circuit for a given zone operates its rollers when the sensor, in an adjacent "upstream" zone, indicates an object is at that zone and the sensor of an adjacent "downstream" zone indicates that no object is in that downstream zone. This logic causes the conveyor zones to move objects along to fill adjoining zones with objects. Generally, each upstream control circuit operates its rollers to move its objects downstream one zone. In order to perform these tasks, the control circuit for a particular conveyor stick may communicate in a limited fashion with the control circuits (or at least the sensors) of an associated, adjacent upstream and downstream conveyor stick. This may be accomplished via cabling between control cards or sensors of the conveyor sticks, typically within one of the side rails.

Several problems currently exist with conventional distributed zone control systems, however. One such problem relates to transmission line issues (e.g., reflections, noise) as a plurality of control stations can be concatenated for larger conveyor lines. Other problems relate to cable and associated installation expenses when adding additional stations to an existing line or in the initial design and installation of the conveyor line itself. This can be caused by the amount of different types of sensors, actuators and controllers that have to be interconnected to form a cohesive system. Still yet another problem involves speed and smoothness during conveyor operations. Due to communications limitations between zones, conveyor speed generally must be limited to avoid causing instabilities in the overall conveyor and associated control process.

Employing a centralized controller over all the zones can alleviate some of the control and stability issues described above. Industrial controllers are special purpose computers utilized for controlling industrial processes, manufacturing equipment, and other factory automation, such as conveyor systems. In accordance with a control program, the industrial controller measures one or more process variable or inputs reflecting the status of a controlled conveyor system, and changes outputs effecting control of the conveyor system. The inputs and outputs may be binary, (e.g., on or off), as well as analog inputs and outputs assuming a continuous range of values. The control program may be executed in a series of execution cycles with batch processing capabilities.

Measured inputs received from a conveyor system and the outputs transmitted to the conveyor system generally pass through one or more input/output (I/O) modules. These I/O modules serve as an electrical interface between the controller and the conveyor system, and may be located proximate or remote from the controller. The inputs and outputs may be recorded in an I/O table in processor memory. Input values may be asynchronously read from the controlled conveyor system by one or more input modules and output values are written directly to the I/O table by the processor for subsequent communication to the conveyor system by specialized communications circuitry. An output module may interface directly with a conveyor system, by providing an output from an I/O table to an actuator such as a motor, valve, solenoid, and the like.

Various control modules of the industrial controller may be spatially distributed along a common communication link in several racks. Certain I/O modules may thus be located in close proximity to a portion of the control equipment, and away from the remainder of the controller. Data is communicated with these remote modules over a common communication link, or network, wherein modules on the network communicate via a standard communications protocol. Although centralized industrial controllers can be effective in controlling a conveyor line, these type solutions can add significant expense to a conveyor system. These expenses include the controller such as a Programmable Logic Controller (PLC), associated racks, I/O modules, communications modules, program software development, and extensive cabling to facilitate centralized control of a distributed conveyor system.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate efficient and robust control of zone conveyer sections in a distributed conveyor assembly. A modular system having sensing input, power output, communications and control logic capabilities is provided in a single zone module that cooperates with other similarly adapted zone modules in a coordinated manner. This includes module packaging features (e.g., low-profile, compact housing), logic decisions, and communications protocols (e.g., serial, parallel, wireless) that facilitate rapid module installation and configuration along conveyor sections while mitigating cable and installation costs. Zone modules cooperate to control multiple conveyor sections having upstream and downstream ends, wherein control can be achieved via multi-zone logic decisions and associated communications. The conveyor sections support powered roller assemblies and associated object sensors that are respectively driven and sensed by the zone modules in accordance with multiple output and input configuration options.

The zone modules of the present invention can be adapted in a plurality of different configurations that support ease of installation and mitigate complexities associated with programming and coordinated control. For example, the zone modules can be installed along the line of a flat cable via clamping style connections such as from insulation piercing vampire pins or other type connection such as from an insulation displacement connection (IDC). Although convenient and robust installation can be achieved via cabling and associated clamping options, the present invention also provides zone control logic that is operative over multiple zones (e.g., considers other zones than just adjacent zones when making zone control decisions)—which supports not only cabled communications but wireless communications can be adapted as well (e.g., Blue tooth/wireless markup language protocol between zone modules and/or between zone module and associated I/O).

According to one aspect of the present invention, a zone module employable in a conveyor system is provided with components for receiving at least one end of a flat cable and a set of vampire pins for engaging with conductors of the cable. This can include power, interface and logic to link several adjacent zones with a minimal set of conductors while mitigating expense and complicated set-up of an addressed communications network. A packaging concept is applied whereby modules contain a sensor and actuator interface as well as logic connecting other similar modules in a conveyor control system by being "stabbed or staked" to a flat, N-conductor cable employing the vampire pins (N being an integer). Unlike other systems, this type connection is daisy-chained rather than bussed, wherein the cable is cut according to a location the module is to be attached—in such a manner as to bridge the aforementioned cut (e.g., directly connected for some conductors and indirectly connected through electronics for others). This type arrangement facilitates a process for configuring a first zone module and automatically configuring another zone module via communications with the first zone module. The process can further employ a serial broadcast message to convey first zone module configurations to other zone modules via module-to-module passage of the first zone module configurations. This can include a module configuration replication feature that enables a user or module to input operational settings at one module and have the settings automatically replicated from module-to-module, thus reducing time and cost to input settings at respective modules.

Yet another aspect of the invention relates to a sophisticated signaling system that provides suitable communication to implement conveyor logic. Conveyor logic includes a coordinated logic system for respective zones in a multi-zone conveyor turning on or off as conveyed product is available to be moved. Communications can be achieved via current and/or voltage pulses that facilitate substantially high electrical noise immunity. In addition, since respective zones signal directly (e.g., electrically) to upstream zones and downstream zones, electrical characteristics of the cable generally do not limit maximum signaling length or effect signal quality from transmission line effects or noise. With periodic addition of diode isolated power supplies, cable length is essentially unlimited.

The signaling and logic system can provide detection of and response to jam conditions (e.g., items jammed when leaving a conveyor zone as well as items jammed when entering a zone) on the conveyors and also to turn off zones that have little productive reason to be running such as initiating a sleep condition to conserve power or reduce audible noise. In contrast to conventional systems, a respective zone module can employ look-ahead or look-behind logic that can incorporate multiple upstream and/or downstream events from non-adjacent zone modules when determining whether to initiate a shut-down in response to detected jam or sleep conditions.

Another aspect provides access (e.g., a multi-use electrical connector that) for temporarily connecting modules together for test purposes in a factory without utilizing vampire connections to the flat cable, which is more permanent. This aspect is significant because conveyors are often factory assembled for test purposes and then disassembled for shipment. The same connector can also be employed as a programming port for inputting operational settings to lower cost versions of the zone module, which may not have other programming aspects (e.g., rotary switches, pushbuttons) of user interface.

According to other configuration aspects of the present invention, different types of zone modules can be connected to the N-conductor cable, including for example, an in-feed module which can be utilized at a very first zone, wherein product loads are introduced to the conveyor system. Other module types can be provided with and without local timing settings along centralized zones of the conveyor, including master module types at the end of the conveyor system. Master modules can issue broadcast settings of timers for substantially all centralized modules that employ similar settings and do not have a separate user interface. Centralized modules that have unique timing requirements can have an associated user interface to set timer values and typically ignore (but relay) broadcast timing settings.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to conveyor control system(s) and/or method(s), which may be operatively coupled with other such systems in order to implement a control strategy for a modular conveyor system. A module and/or series of modules are provided that clamp to a cable (e.g., flat four-conductor cable, and/or bridge to other media than cable), the modules having associated logic and inter-module communications for control. This includes relatively inexpensive power distribution, interconnection (such as for example to photoelectric sensors and actuators such as air valves or motor controllers) and motion logic for industrial conveyor systems.

Figure 1:
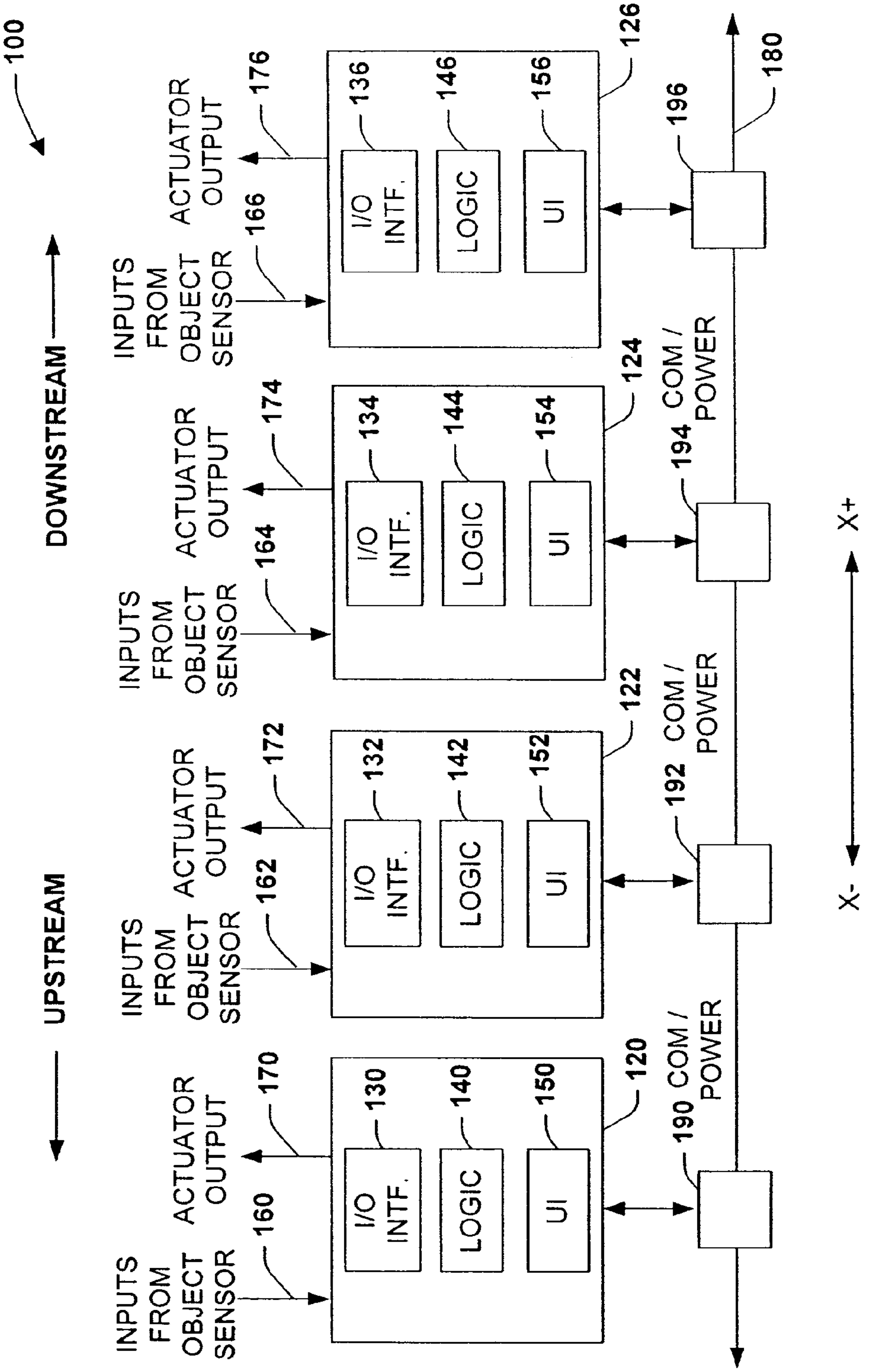
FIG. 1 is a schematic block diagram illustrating a multi-zone control architecture in accordance with an aspect of the present invention.

Referring initially to FIG. 1, a multi-zone conveyor system 100 is illustrated in accordance with an aspect of the present invention. The system 100 generally includes a plurality of zone modules 120-126 that cooperate to control associated conveyor sections (not shown). This can include Y upstream zone modules (Y being an integer) configured in an X− direction, upstream defined toward direction from which product approaches a zone, and include Z downstream zone modules (Z being an integer) configured in an X+ direction, downstream defined toward direction from which product departs a zone. Respective zone modules 120-126 include associated I/O interface components 130-136, logic portions 140-146, and user interface portions 150-156 that interface with object sensors 160-166 and actuator outputs 170-176, respectively, to control associated conveyor sections.

A segmented cable trunk line 180 provides power and facilitates control and communications between the zone modules 120-126, wherein attachments to the cable can be provided via vampire couplings illustrated at 190-196. Although the system 100 may be described in terms of flat cables and vampire couplings, it is to be appreciated that other interface media may be employed. For example, the trunk 180 could be provided as a round cable, wherein the couplings 190-196 are achieved via mini/micro connections. Other type couplings can include Insulation Displacement Connections (IDC) to the cable 180. Rather than a cable media 180, wireless communications can be provided between the zone modules 120-126 and/or between a respective zone module and an associated I/O point. For example, wireless protocols such as Bluetooth protocol (or other wireless protocol such as WML) can be utilized to coordinate communications between the zone models 120-126 and/or to a respective I/O node.

The zone modules 120-126 provide relatively low cost, feature rich aspects, which offers users substantial flexibility when engineering and assembling an accumulation conveyor system. This includes input connections at 160-166 for a photoelectric sensor, output connections at 170-176 to a solenoid or DC motor, for example, flat wire cable connections at 190-196 for DC power/communications, including provisions for multiple types of other zone modules (described below) in an upstream zone, a downstream zone, or both. Variations on basic module types also provide screw terminals for connection of a zone release switch, a slug release switch, a zone infeed switch, a zone state output and a separate connector which mirrors the flat wire 180 connections, for test mode.

The logic portions 130-136 can support various internal logic functions such as: single-zone control, multi-zone control employing non-contiguous module events, slug release mode, wherein a slug operation is defined as an operation that causes several zone modules to cooperate at the farthest portion of the downstream end to discharge a predetermined number of objects from the conveyor system. Other logic functions include sleep functions with settable timers, jam detect functions with settable timers, ON/OFF Delays for conveyor drive, output inversion functions, slug release one shot timers with hold features, zone release one-shot timers with reset features and other counter logic. These aspects will be described in more detail below.

The zone modules 120-126 can be housed in a molded plastic enclosure, for example, having vampire pins that pierce the flat cable 180. This can include I/O headers (e.g., photo-eye and actuator) and a test header to mimic or mirror the flat cable 180 connections. In addition, PCB header connectors and screw terminals can be provided for a zone release input, a slug release input and the master full output signal, if desired. The user interface 150-156 can include various combinations of switches, pushbuttons, lights or LEDs, connectors and/or other components to facilitate programming, configuration, and/or control of the system 100.

The present invention provides many advantages over conventional systems. This includes employment of flat cable media with vampire style pins (or other type such as IDC), thus cable wiring or tubing between zones to drive actuators is mitigated. Other features include support of pneumatic valves or power rollers and support of a factory or testing harness/connection without making permanent connections to the zone modules 120-126 or cable 180. Other logic capabilities include module configuration replication features, low power consumption for enabling a large number of nodes on a single class II bus, a multi-zone sleep/jam mode algorithm wherein non-adjacent zone events are considered, a current loop interface for high noise immunity, high density, and inter-zone connectivity on a single wire, and providing flexibility to support additional logic extensions or control options.

Figure 2:
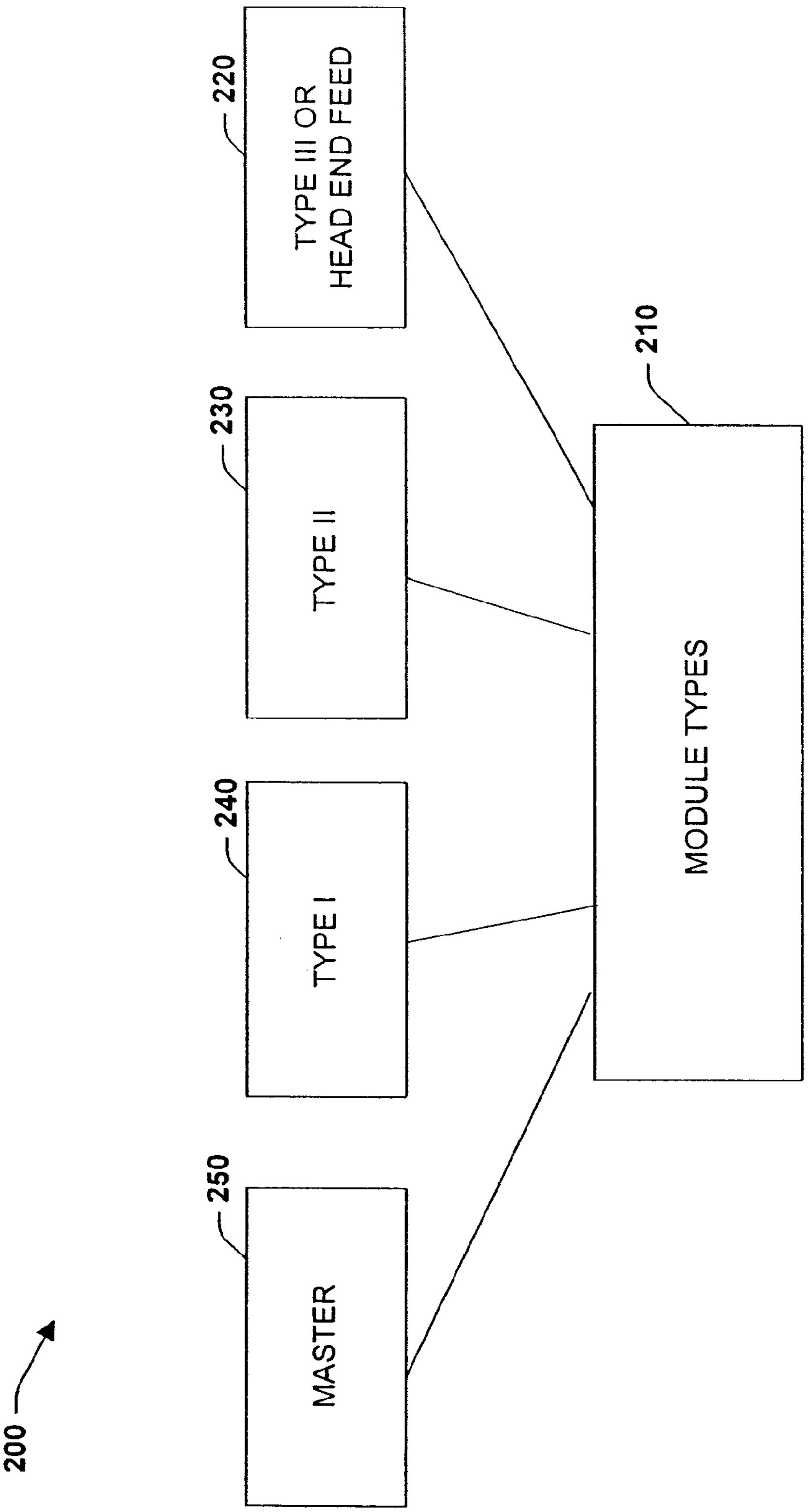
FIG. 2 is a diagram illustrating zone module types in accordance with an aspect of the present invention.

Referring now to FIG. 2, a diagram 200 illustrates module types in accordance with an aspect of the present invention. At 210, a respective zone module can be configured according to a type via automated processes (e.g., downloading program code) and/or manual processes such as via dipswitch settings or pushbuttons, for example. Generally, a conveyor system starts with a type III module 220 at an in-feed or head end (farthest upstream point), followed by a number of type II modules 230, for most intermediate zones, with possibly a smaller number of type I modules 240 for special sections (e.g., curved conveyor sections) and followed with a single master module 250 at a discharge end of the conveyor system (farthest downstream point).

Type II zone modules 230 are typically a basic zone module having a small number of dipswitches (e.g., four) for basic mode and function configuration. This type can also process timers that have been initialized within it by a broadcast message from the master module 250. Typically, no other information or settings are achieved by broadcast messages that are employed when predominant or standard system timing values apply. The type I zone module 240 has the capabilities of the type II zone module 230 and in addition can have a pushbutton and rotary selector switches for configuring timers locally. It can be employed in curved and/or other conveyor sections that require unique or configurable timing other than utilized in the larger majority of zones in the conveyor. In addition, type I zone modules 240 generally do not respond to broadcast messages.

The type III zone module 220 is similar to the type II zone module 230 except that in addition, it can have an additional terminal block connector employed for connection to an external product fill switch, in-feed zone full output, and associated logic. It is configured to require no upstream communication or logic, process switch input for fill rather than release, and to disable broadcast mode. The master module 250 is similar to the type I zone module 240 except that in addition, it has the capability to generate broadcast messages to configure type II modules for timer settings, and it has additional terminal block connectors for connection to an external slug release switch, zone release switch and/or a master zone full output signal.

Figure 3:
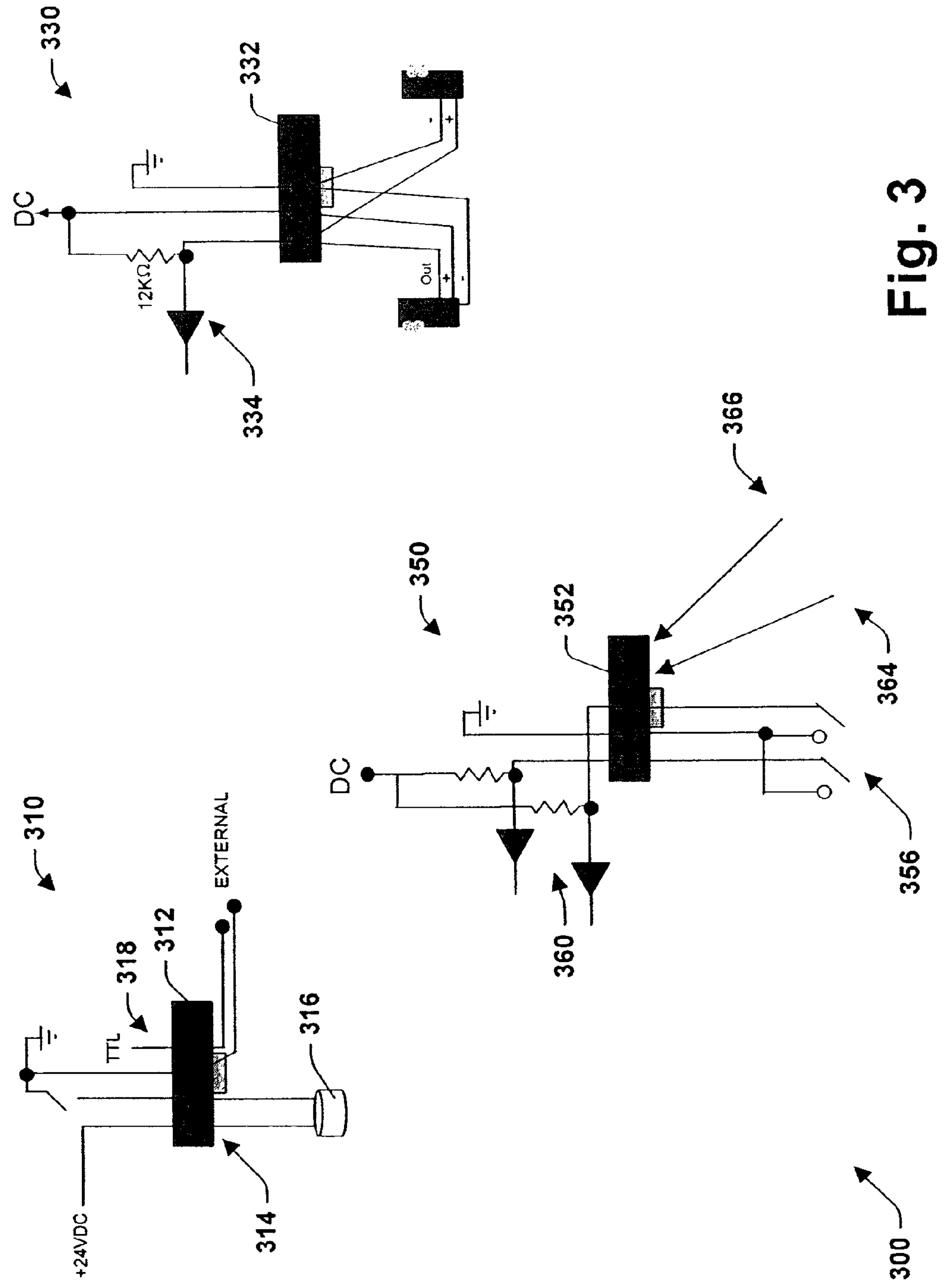
FIG. 3 is a schematic diagram illustrating I/O interfaces in accordance with an aspect of the present invention.

Referring to FIG. 3, possible zone module I/O connection options 300 are illustrated in accordance with the present invention. At 310, an actuator connector 312 can be driven by a DC source (e.g., 24V) and associated solenoid or relay contacts at 314 to engage a valve, brake or power-roller enable circuit 316. The connector 312 can also supply TTL or other type logic at 318 to drive an external actuator circuit for moving or stopping a conveyor section. At 330, possible input sensor connections are illustrated. This can include 2 or 3 (or other type) wire sensor inputs at a connector 332 that lead to internal power, ground, and input buffer portions at 334. At 350, a connector 352 receives slug zone release or product fill inputs at 356 that couple to module input buffers at 360. A zone full and/or other type output can be provided at 364 and 366.

Figure 4:
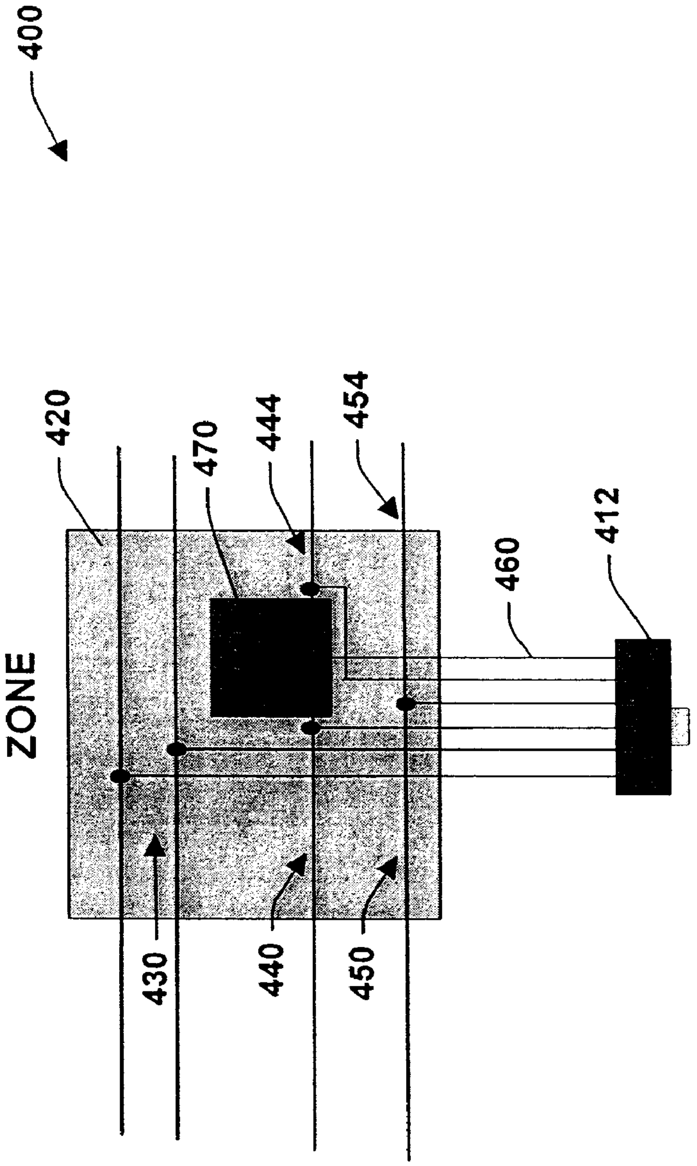
FIG. 4 is a schematic block diagram illustrating a test and programming interface in accordance with an aspect of the present invention.

Referring to FIG. 4, a diagram 400 illustrates test and programming zone module connection options in accordance with an aspect of the present invention. A connector 410 can be coupled to a zone module 420, wherein portions of the connector support test options such as providing an alternative coupling to other zones modules without employing flat cable connections. As illustrated, pins of connector 410 are coupled to positive and negative supply rails at 430, to bi-directional connections for upstream and downstream zones at 440 and 444, and to general-purpose connections for upstream and downstream zones at 450 and 454. Thus, the connector 412 can be employed in place of flat cable for temporary or testing situations. Another aspect includes an input at 460 that is processed by a logic circuit 470 to determine if online or offline configurations are to be employed (e.g., low/online, high/offline).

Figure 5:
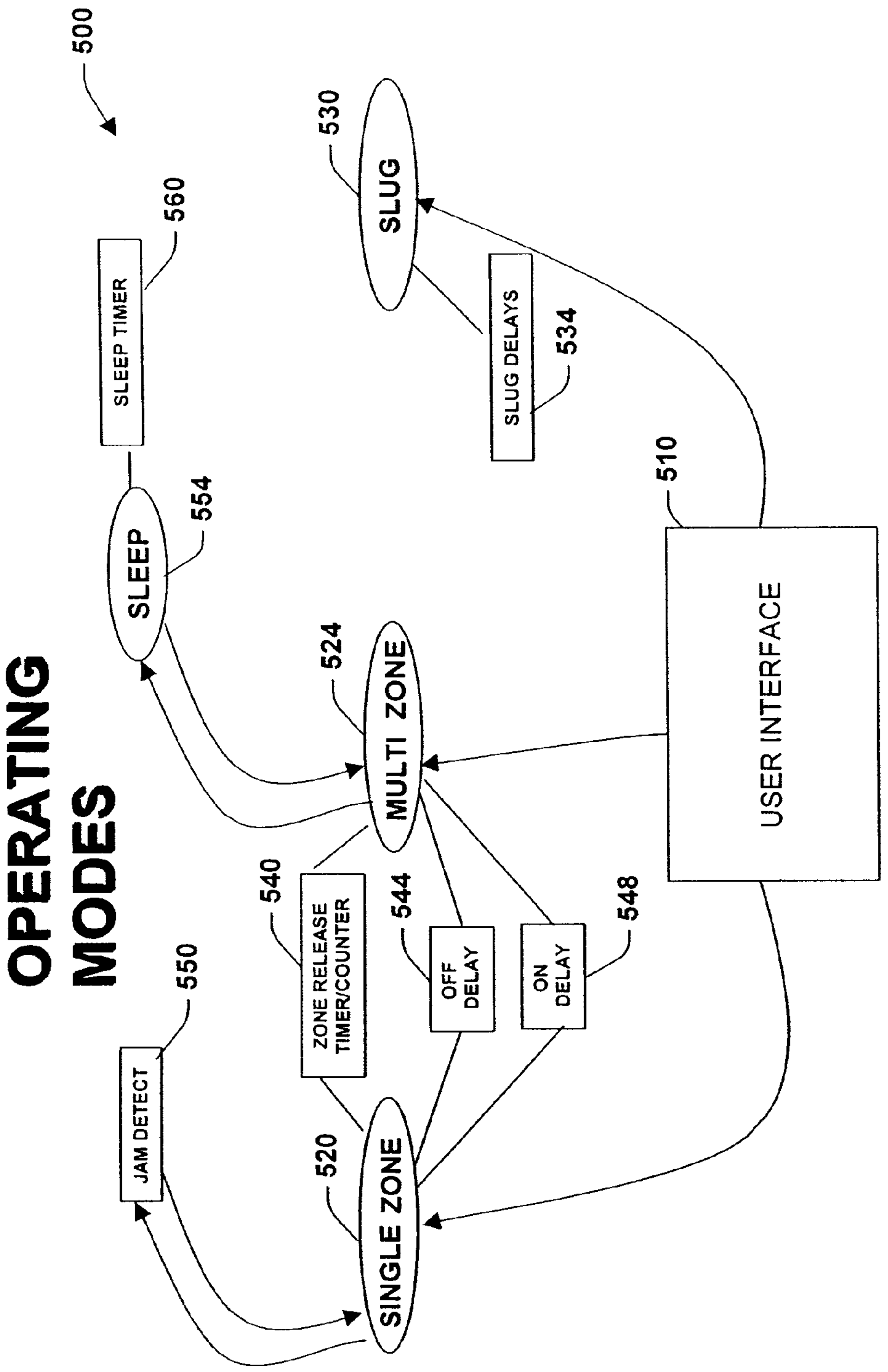
FIG. 5 is a diagram illustrating operating modes in accordance with an aspect of the present invention.

Referring now to FIG. 5, a diagram 500 illustrates one more operating modes in accordance with the present invention. A user interface 510 (e.g., computer serial connection, switches) can configure one or more of the modes illustrated at 500. The modes can include single zone controls at 520, dual or multi-zone controls at 524 and slug controls at 530 configurable with an associated slug delay and/or slug number to discharge a predetermined number of conveyor objects at 534. Zone logic controls can also include zone release timer/counter options at 540, and/or on/off delay times at 544 and 548 to facilitate coordination between zones. Other modes can include single zone sleep/jam detect modes at 550 and/or multi zone sleep/jam detect/enable modes at 554 having associated sleep timing logic at 560.

The modes illustrated at 550 or other modes described below facilitate coordination between zones. In general, a zone accepts direct state input from previous (upstream) zone, if any, from the following (downstream) zone, from the zone following the following zone, and so forth if so programmed, if any, and employs these states to drive its own actuator. A zone resolves its own logic and decides when to drive and when not to drive (e.g., except in slug release mode). This mitigates the need to connect zones with actuator wires or tubes. Thus, zone logic is generally set in the zone itself. A zone can also be configured for its own time delay and its own enabling or disabling of slug respond mode.

The Sleep mode at 554 is generally not initiated in a dormant zone but rather enabled by a previous (upstream) zone, subject to its own photo sensor state. A sleeping zone has an associated actuator set to off and otherwise is active, including communications. Slugged zones 530 are in a single contiguous group starting with the discharge (master) zone, wherein the configuration of slugged zone groups is optional. As will be described in more detail below, transport and accumulation logic can be based on direct states (e.g., photo states) as well as implied states (e.g., existence of a box between photo sensors implied by leaving one zone and not yet arriving at the next zone). On delay or Off delay modes at 544 and 548 can be set to zero for most zones or are set to similar values in most zones. Typically, most inner or centralized zones receive timer settings serially but some (e.g., type I) have them set locally at the module. In addition, modules can be configured according to a communications majority vote size that is based on a size required for a previous message.

Figure 6:
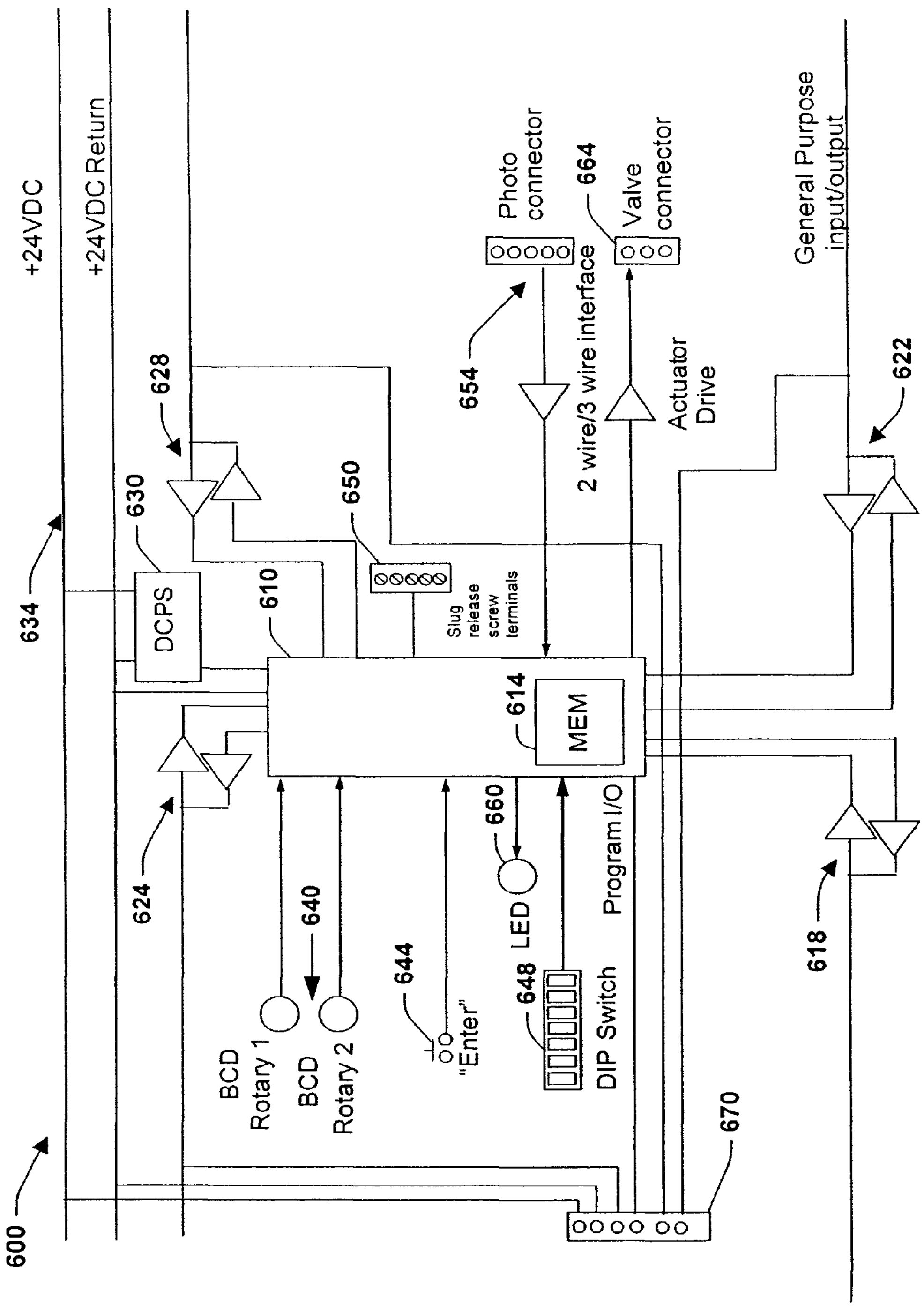
FIG. 6 is a schematic block diagram illustrating a zone control module architecture in accordance with an aspect of the present invention.

Referring to FIG. 6, a system 600 illustrates architectural aspects of a respective zone module in accordance with an aspect of the present invention. The system 600 includes a processor 610 having an associated internal/external memory 614 to execute instructions and logic in accordance with the present invention. The processor 610 can receive logic/state inputs from and send logic/state outputs to general purpose buffers 618, 622 and 624, and bi-directional buffers 628. A DC power supply 630 can convert external power at 634 to lower levels suitable for logic controls. The processor 610 can read switches at 640, 644, and 648, slug inputs at connector 650 and photo sensor inputs at 654. Processor 610 outputs can be directed to LEDs at 660, the slug connector 650, and a drive connector at 664. A programming and test mode connector can be provided at 670 that can also be read and written to by the processor 610.

According to the logic described above at 600, several operating functions and modes are possible. This includes, for example, driving indicators 660 such an orange or other color indicator that illuminates when the actuator 664 is active and is otherwise dark except for: error conditions (e.g., SCP, lost communications, no photo margin in which case it can flash at a 0.5 Hz. or other rate (true for all modules); signifying the acceptance of timer values in which case the LED 664 can flash twice (or other number); and during a configuration replication process in which case the LED illuminates until either replication times out or a successful broadcast occurs in which case it can flash twice or other number (master module only)

The switches 648 enable selecting operating modes (all module types) including single zone logic, dual/multi zone logic, and slug mode. Other switch selections include, when set to ON or 1, for example, turns on output current when the zone logic is true or, alternately, when set to OFF or 0, turns off output current when the zone logic is true. This can include setting slug, on, off, jam and sleep timers/counter modes (e.g., master module and type I and III zone modules).

The rotary selector switch at 640 can set timer or counter values while a second rotary selector switch at 640 can set one of ten preset timer values, followed by pressing the enter pushbutton at 644 and releasing after which the indicator 660 flashes twice or other number to verify acceptance of the timer or counter value. Unused timers are generally set to zero. The time associated with switch positions can be factory set in memory 614 during final test and may range between 0 and 255 (or other range) multiplied by a time base that can be factory set as 50 ms or 100 ms, for example.

When a replication configuration dipswitch is cycled from OFF to ON (e.g., switch 648), replication of settings is generally enabled for 15 seconds or other predetermined time. During this time, when the enter pushbutton 644 is held, a unique message is broadcast to all zones, and interpreted by type II zone modules described above. For example, the message can consist of a 1800 uS sync start pulse (or other time) that identifies it as a configuration message, followed by a one byte preamble (or more or less than one byte), a 450 uS sync pause (or other time), 7 data bytes (or more or less bytes) (with standard 200 uS bit intervals (or other time) and parity protection) containing codes for respective timer settings with 450 uS sync between bytes (or other time), followed by an end of message byte and a checksum of the entire message.

Upon receiving a sync start pulse, any node that calculates a checksum error will drive the slug release line low at 650 through an open collector for 200 uS to indicate a message receive error. The master module can continue to retry until no receive message error signal is given or after a predetermined number of attempts (e.g., one hundred attempts), after which it will signal success with a brief flash of the indicator 660 three times, or failure by a long flash of the indicator three times (or other number). If a replication dipswitch is returned to the off position, replication will terminate. Other conditions can also terminate replication such as if the enter pushbutton 644 is released before successful transmission of parameters.

One pin on the programming connector 670 is employed to emit timer settings from the master module and to receive the same settings in either type I, or II or III modules. Type I or II or III modules will generally listen for this type signaling in normal operation. The signaling is emitted from the master module during a replication sequence. This causes configurations to be transmitted to the entire system of modules over the flat cable and also from the programming connector 670. This permits modules to be individually configured at anytime. Alternatively, configurations can be passed from module to module via serial communications.

Figure 7:
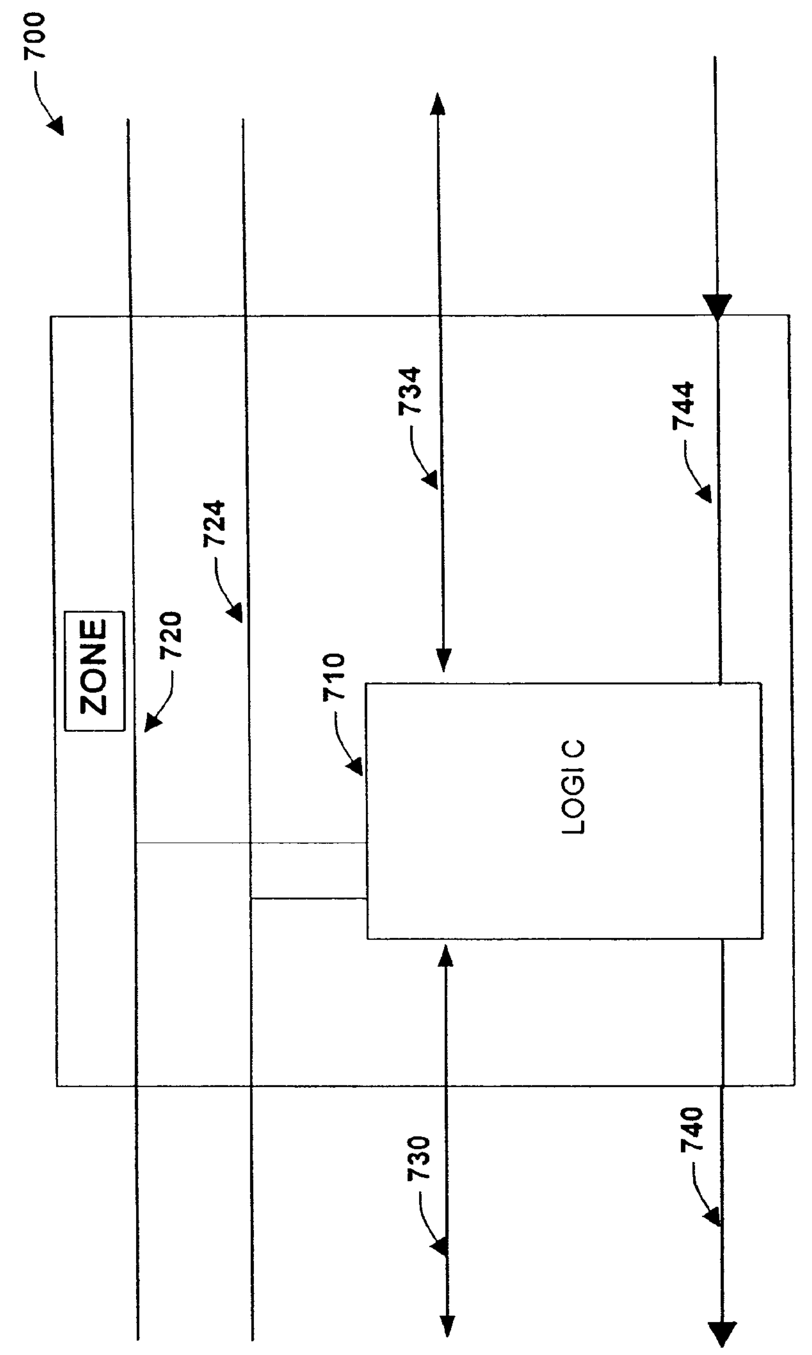
FIG. 7 is a diagram a zone control module interface in accordance with an aspect of the present invention.

FIG. 7 illustrates a block diagram 700 that depicts general signal flows for a zone module in accordance with the present invention. A logic portion 710 represents the components described above in FIG. 6. Positive and negative supply rails are provided at 720 and 724, whereas bi-directional upstream and downstream connections are provided at 730 and 734. General-purpose upstream and downstream connections are provided at 740 and 744, respectively.

Figure 8:
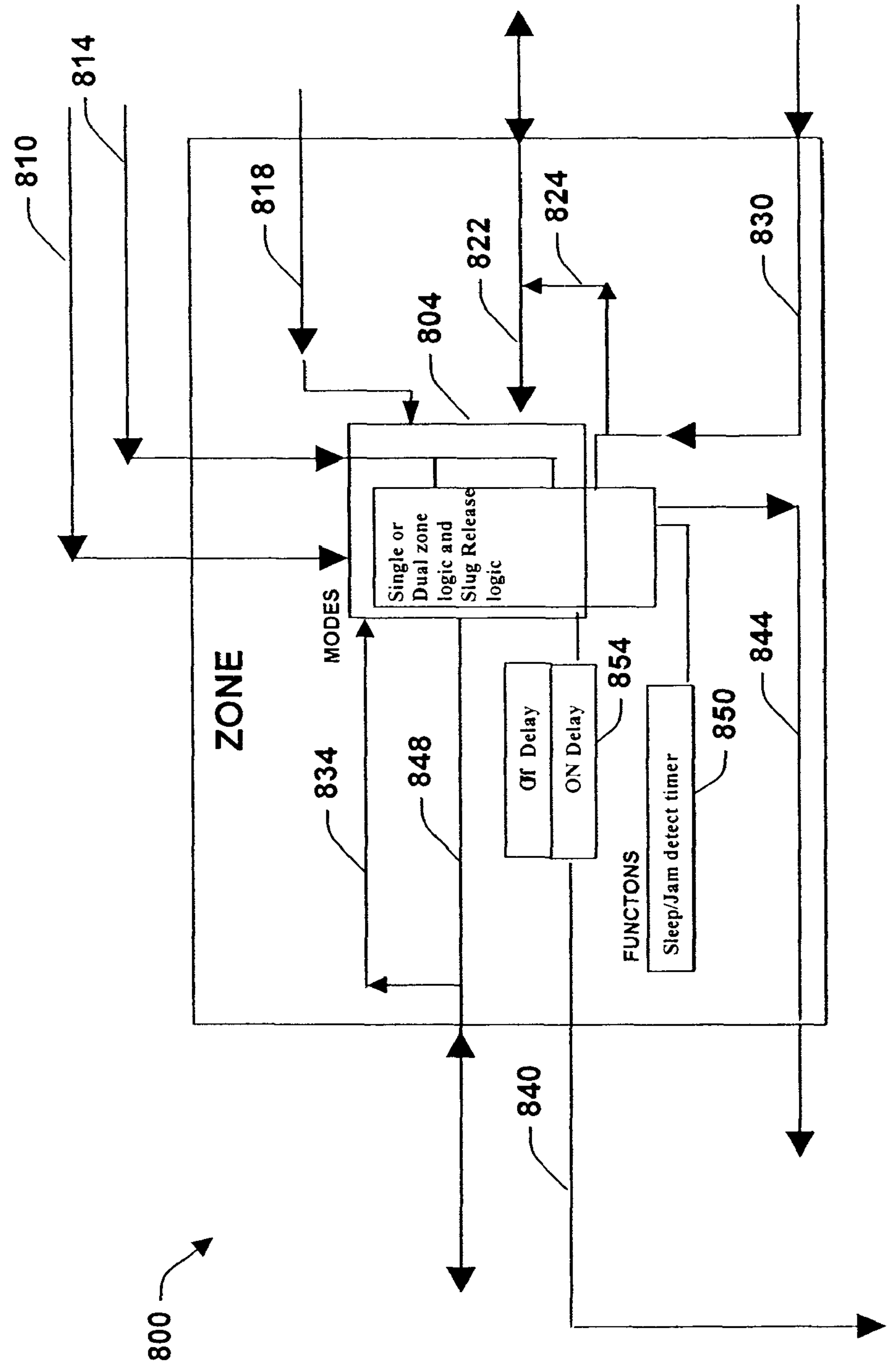
FIG. 8 is a signal diagram for a zone control module in accordance with an aspect of the present invention.

FIG. 8 illustrates a more detailed signal diagram 800 in accordance with the present invention. This includes a logic module 804 receiving own zone photo states at 810, own zone switch inputs such as a slug inputs at 814, own zone external release inputs at 818, inputs from, and outputs to, downstream zones at 822, the outputs including a sleep awake command at 824, and slug input signals from downstream modules at 830. At 834, a sleep awake input command can be received by the logic module 804. Outputs sent by the logic module 804 include output to own zone actuator at 840, general outputs to upstream modules at 844, and other upstream command outputs at 848. As illustrated, sleep and jam functions can be provided at 850, whereas on and off delay functions can also be provided at 854.

Figure 9:
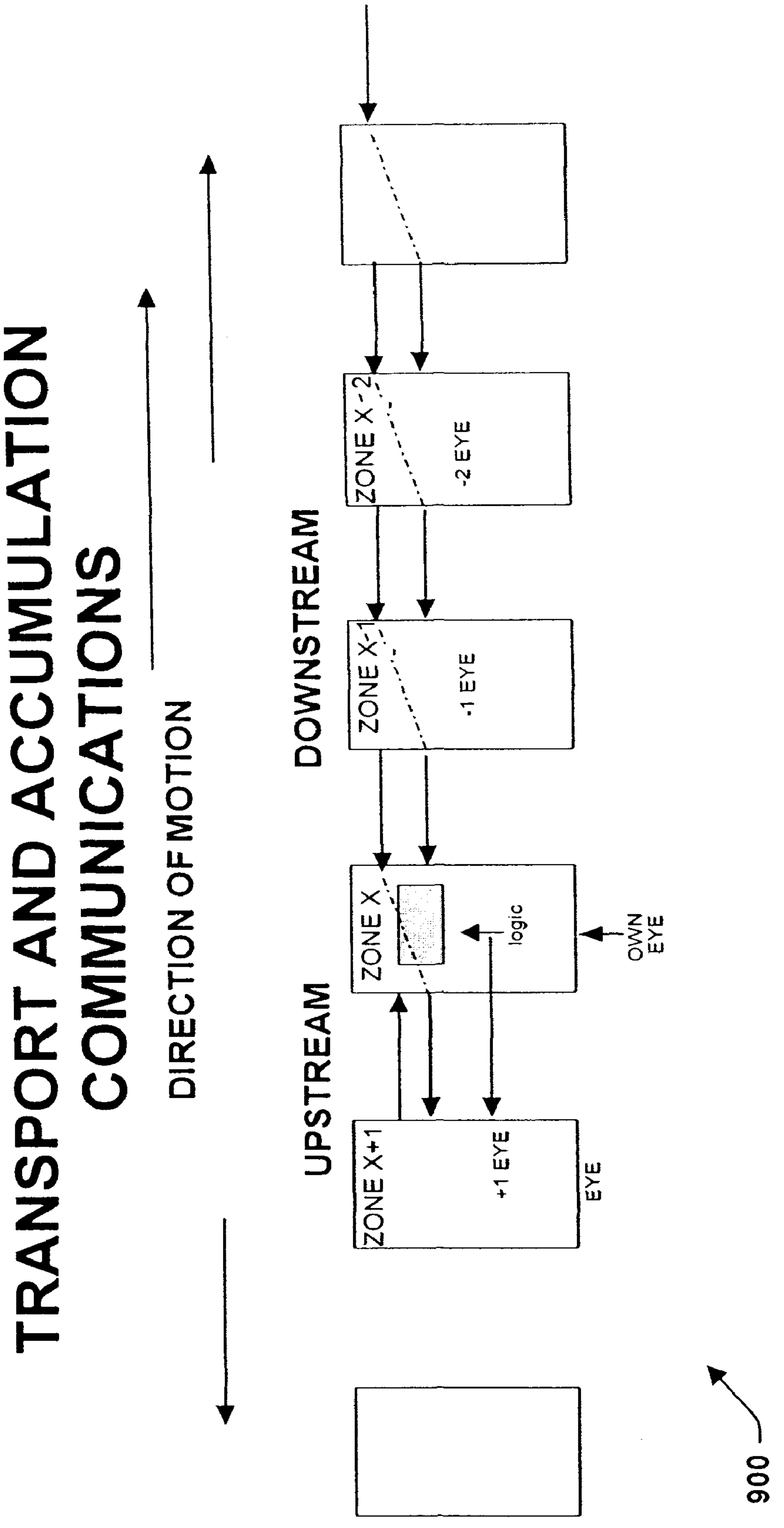
FIGS. 9 through 13 are logic diagrams for a zone control module system in accordance with the present invention.
Figure 10:
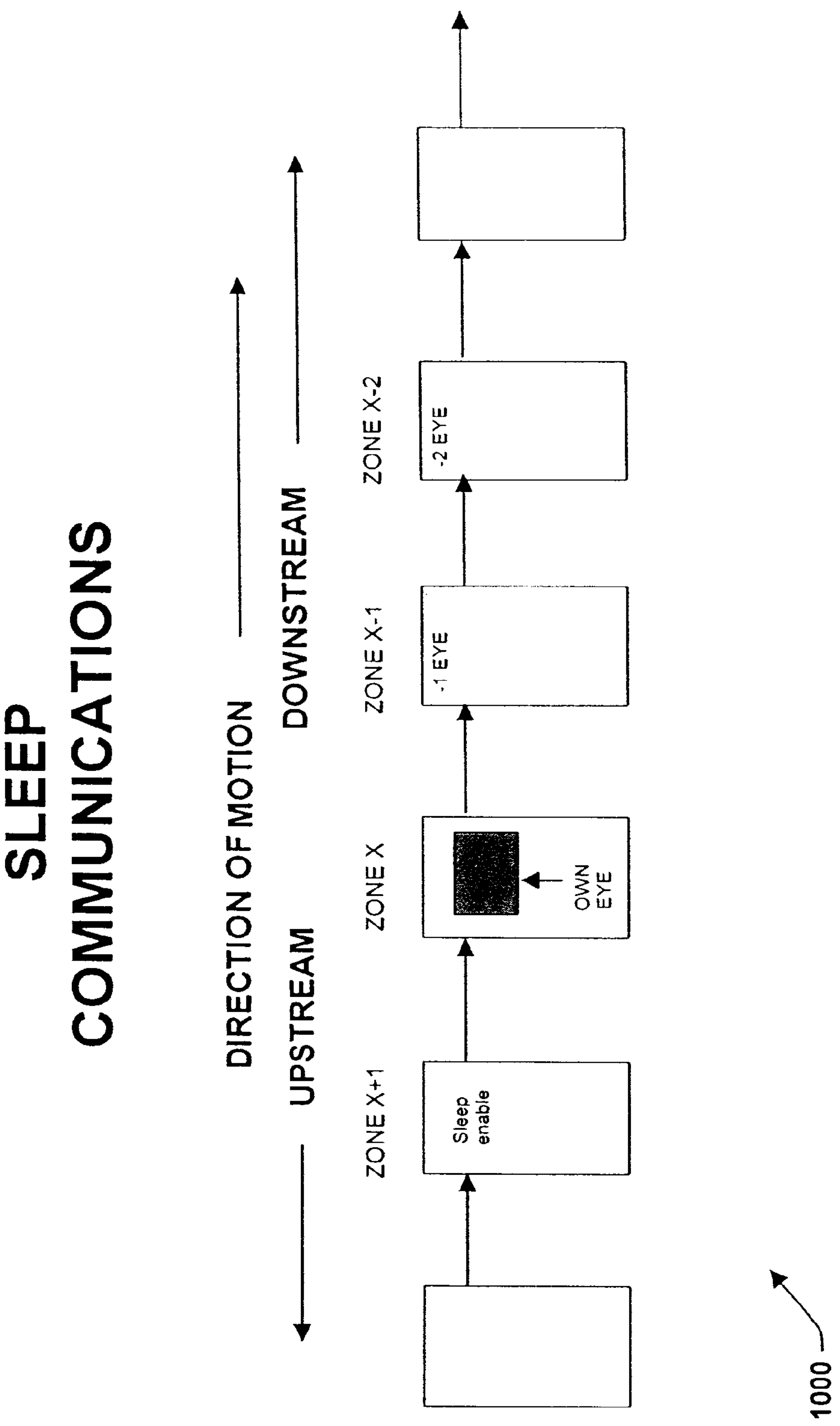

FIGS. 9-12 illustrate general signal flow diagrams for accumulate, transport, sleep and jam communications in accordance with the present invention. FIG. 9 illustrates a diagram 900, depicting zone modules having basic transport and accumulation logic. Respective zones employ a photo state from an upstream zone X+1, and two downstream zones, as well as its own photo state, wherein a photo state of the zone two positions further downstream such as X−2 that is relayed through a zone downstream such as X−1. FIG. 10 is a diagram 1000 depicting aspects of sleep communications. For Sleep logic, upstream zone X+1 detects inactivity in its area and enables sleeping in a downstream zone X. Zone X goes to sleep when its own eye and incoming area are clear. Similarly, when Zone X becomes inactive it enables sleep in a downstream zone X−1, wherein releasing sleep enable reactivates the zone. An alternative Sleep function is implemented by adding a second sleep enable bit to the message such that the first bit awakens the zone following the zone sending the message and the second bit causes the zone one position further downstream to awaken. In this manner, when product begins to move into a sleeping section of zones, the zones awaken more than one at a time so that quickly moving product cannot enter a zone before it has had time to reach operating speed.

Figure 11:
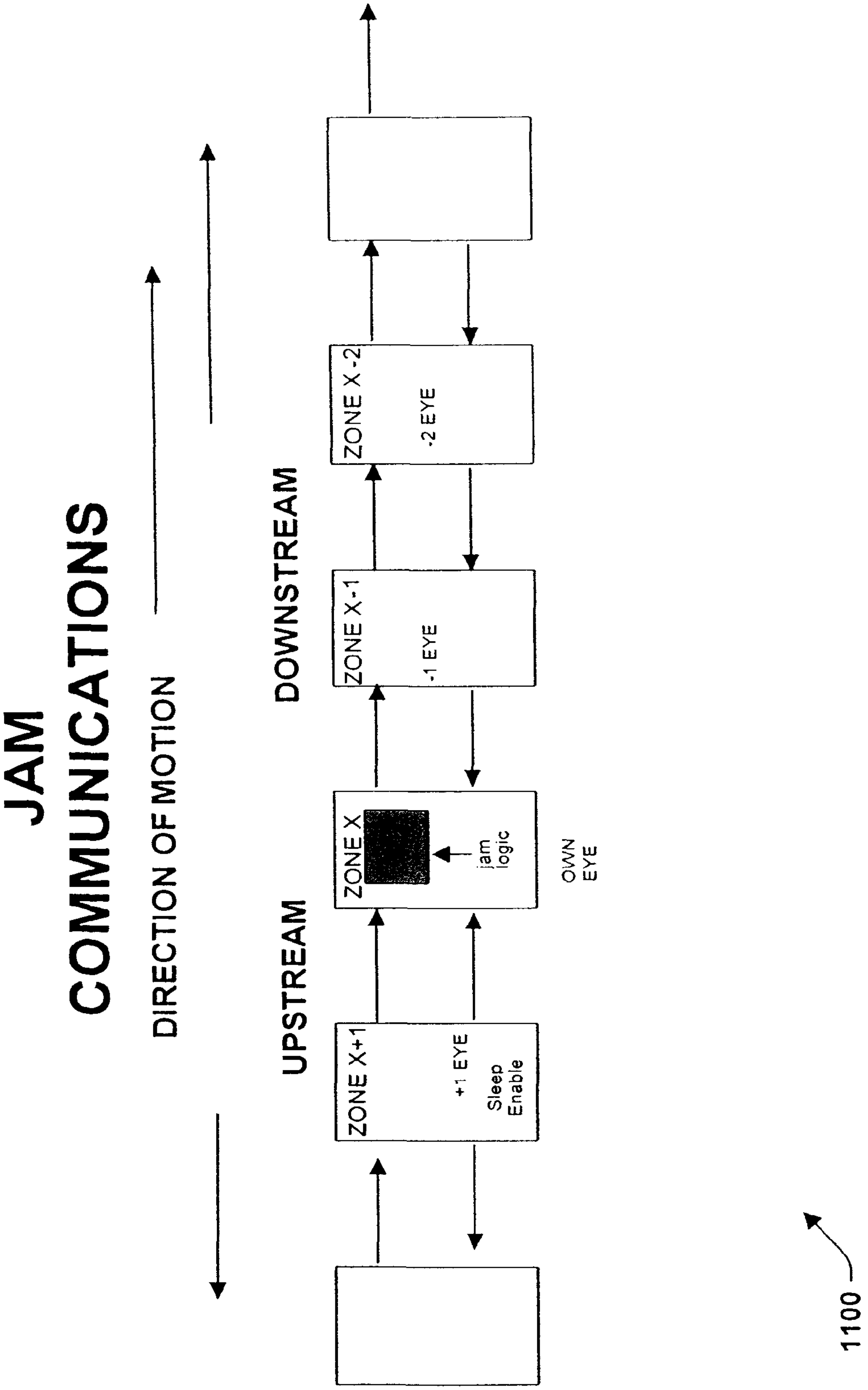
Figure 12:
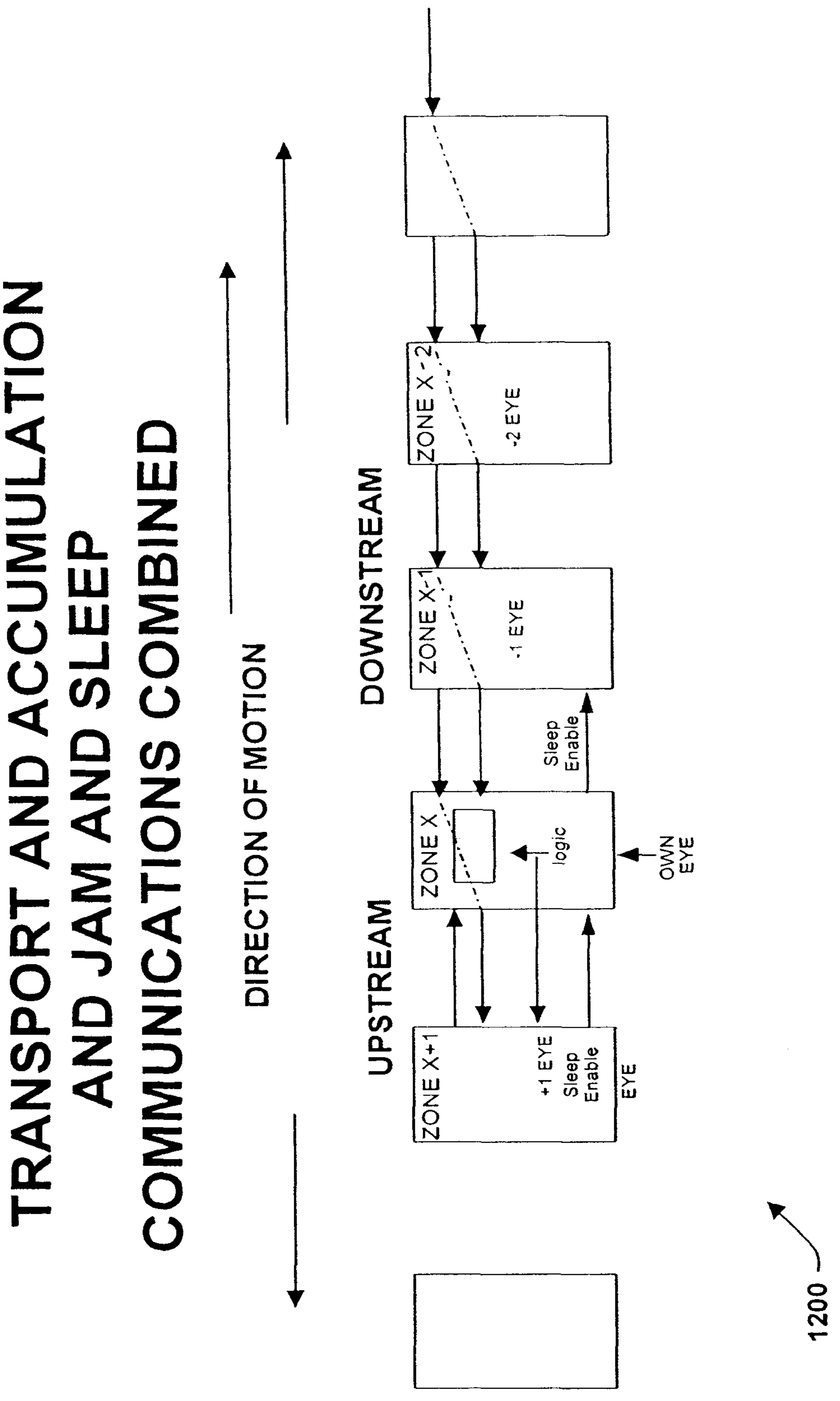

FIG. 11 is a diagram 1100 depicting aspects of jam communications. For Jam logic, upstream zone X+1 determines it has driven its load toward zone X and detects if it failed to clear its own eye without an external input. If a jam occurs in zone X+1, it can stop zone X utilizing sleep enable. Similarly, zone X determines when a load transitions an eye X+1 and if the load fails to arrive. FIG. 12 is a diagram 1200 illustrating combined aspects of FIGS. 9-11, wherein it is noted that sleep enable signals are employed between several modules to facilitate both sleep and jam logic.

Figure 13:
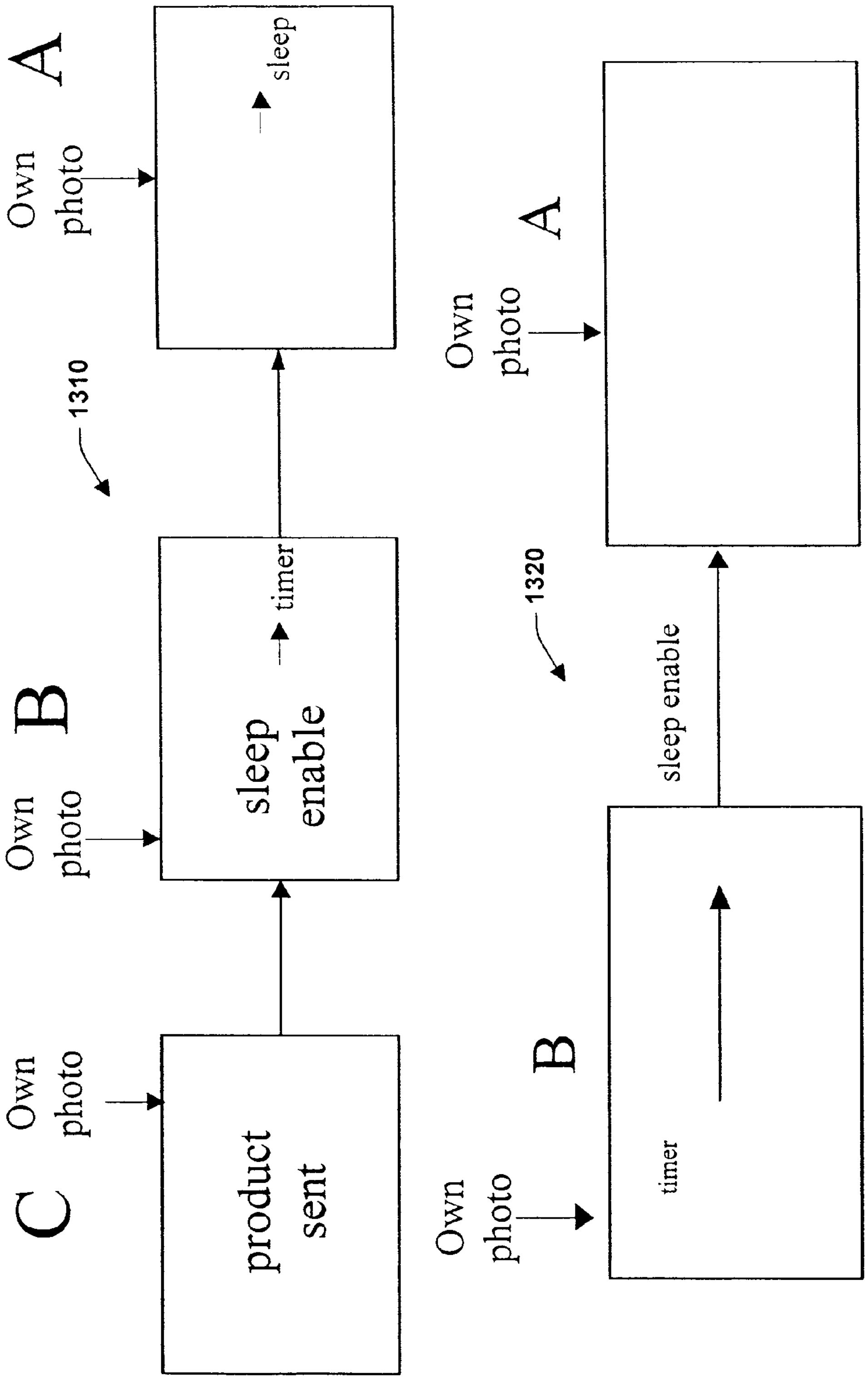

FIG. 13 illustrates more detailed sleep and jam logic in accordance with the present invention. A diagram 1310 illustrates exemplary sleep logic having zones A, B, and C, whereas a diagram 1320 illustrates exemplary jam logic having zones A and B. At 1310, the following logic example can be applied for sleep logic:

a) sleep enable state=no product detected at B AND no product coming from zone C AND no product in transition in zone A from zone B, all for a time.

b) sleep state=sleep enable and no product at photo A, wherein a zone is awakened by zone B if photo B detects product, and may drive for a fixed period of time or until photo A detects product.

c) Zone A cannot awaken itself d) Timing is done in zone B e) Zone B detecting no product is not enough to enable sleep in zone A f) Zone C participates in enabling sleep in zone A g) Zone A product detect can not awaken zone A h) Sleep enable of zone A shared with Jam detection logic It is to be appreciated that more than two zones can be considered in determining whether a zone can go into sleep mode. For example, an upstream zone D and E (not shown) could be employed to base sleep enable on the conditions of zone C in FIGS. 13, D, and E. By employing multiple logic events from upstream and/or downstream modules, the overall speed of a conveyor line can be increased while control instabilities can be mitigated such as jittery or oscillatory line operations.

At 1320 of FIG. 13, the following logic example can be applied for jam logic: Jam State=product detected at B for a set time b) Result of jam=B motor turns off and zone B sends a “sleep enable” to zone A to cause it to turn its motor off when its photo is unblocked.

c) Zone B leaves jam mode when its photo becomes unblocked (e.g., jam is cleared either by an operator or by random motion) AND it “awakens” zone A which has the effect on Zone A of causing a brief interval of motor drive (e.g., for clearing out un-jammed product which may still be on the conveyor) followed by normal operation.

d) Zone B starts up after the jam clears and runs in case there is a formerly jammed product just beyond its photo eye and times out after an interval and stops, which accommodates a case in which the jammed product has been entirely removed from the conveyor system. As noted above, these type conditions can be detected further upstream and/or downstream if desired by sampling events from more distant zone modules.

Figure 14:
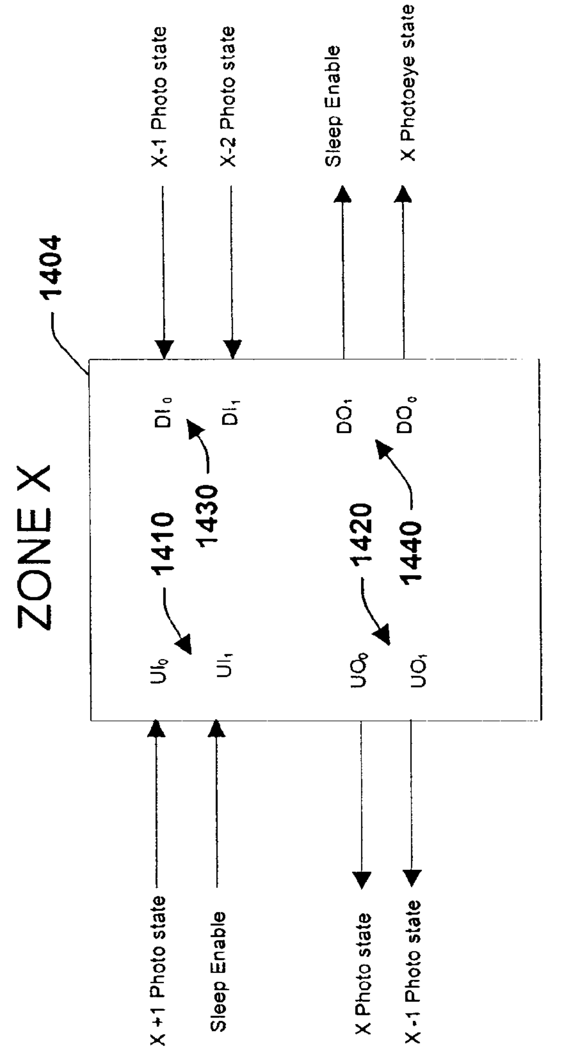
FIG. 14 is a state diagram for a zone control module in accordance with the present invention.

FIG. 14 is a signal diagram 1400 illustrating processed states and variables by a zone module 1404 in accordance with an aspect of the present invention. At 1410, upstream inputs $UI_0$ and $UI_1$ of the zone module 1404 receive states X+1 photo state and sleep enable, respectively, from upstream modules (not shown). At 1420, upstream outputs $UO_0$ and $UO_1$ transmit states X photo state and X−1 photo state, respectively, to upstream modules. At 1430, downstream inputs $DI_0$ and $DI_1$ of the zone module 1404 receive states X−1 photo state and X−2 photo state, respectively, from downstream modules (not shown). At 1440, downstream outputs $DO_1$ and $DO_0$ transmit states sleep enable and X photo state, respectively, to downstream modules.

Figure 15:
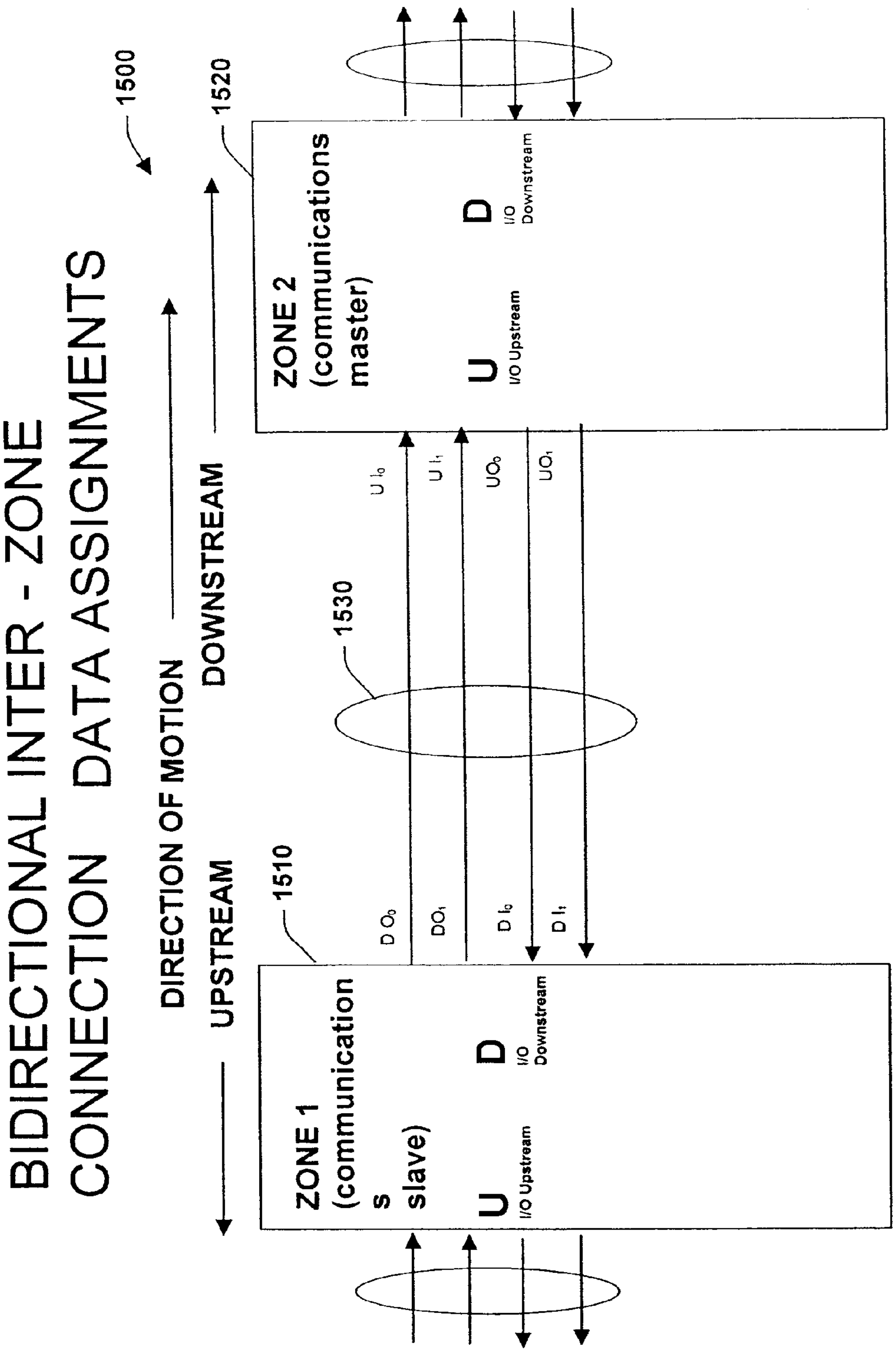
FIG. 15 is a signal state diagram between zone control modules in accordance with the present invention.
Figure 16:
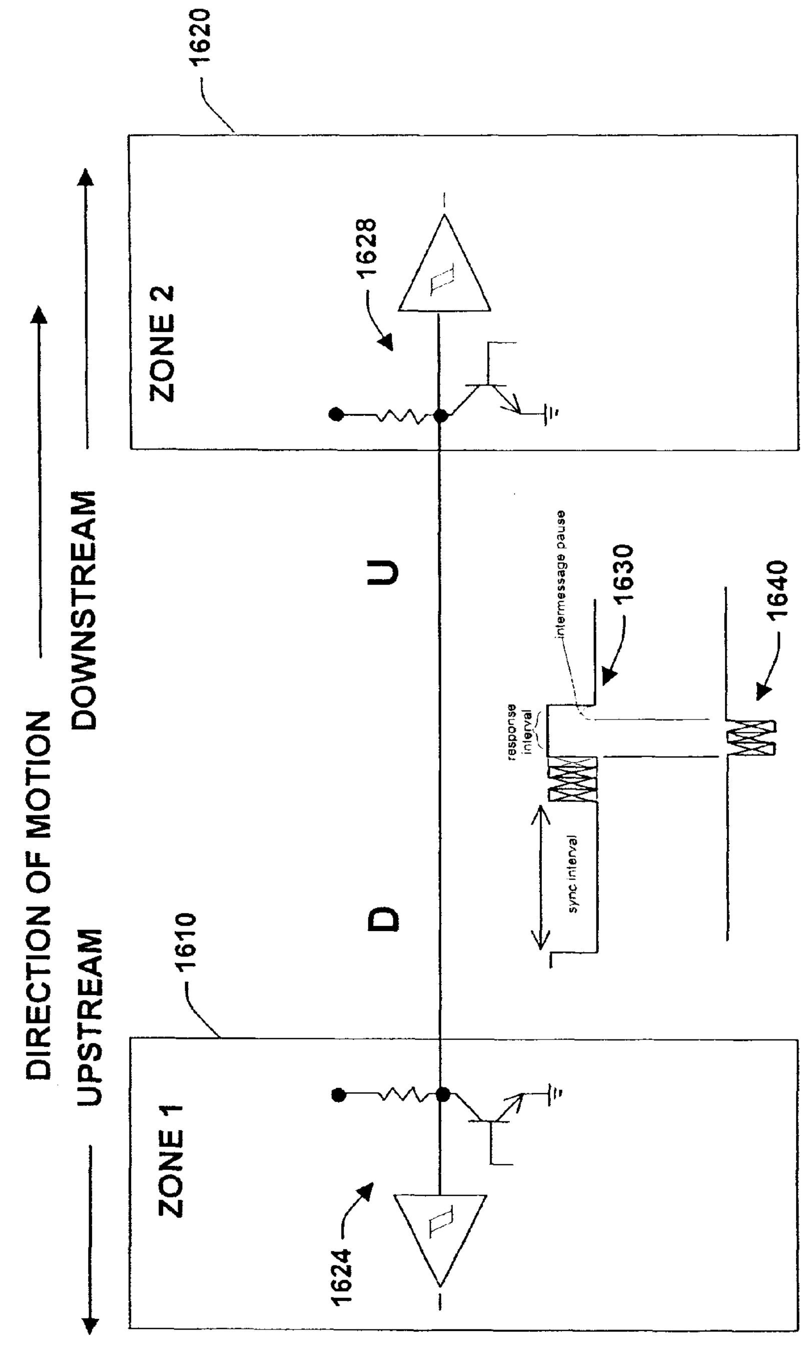
FIG. 16 is a diagram illustrating bi-directional signals between zone control modules in accordance with the present invention.

FIG. 15 illustrates a bi-directional inter-zone communications diagram 1500 in accordance with the present invention. A zone 1 module 1510 transmits downstream data and receives downstream data from a zone 2 module at 1520 via a multiplexed bus having a single wire at 1530—although, it is to be appreciated that the bus 1530 can include more wires if desired. FIG. 16 illustrates example signal exchanges. A zone 1 module 1610 and a zone 2 module 1620 are provided with standard bi-directional drive and receive logic at 1624 and 1628 (e.g., Schmitt triggers for receive buffers, pull-up transistors or FET’s for drive outputs). As illustrated at 1630 and 1640, communications between zone modules 1610 and 1620 can be provided by a series of pulses, then a pause to listen for a response. Substantially, any predetermined time can be employed for pulse widths and associated pause delays when listening. As described above, serial port logic can be employed having start stop, parity and other type bits (e.g., synchronization bits) to facilitate efficient and accurate data transmissions between modules.

Figure 17:
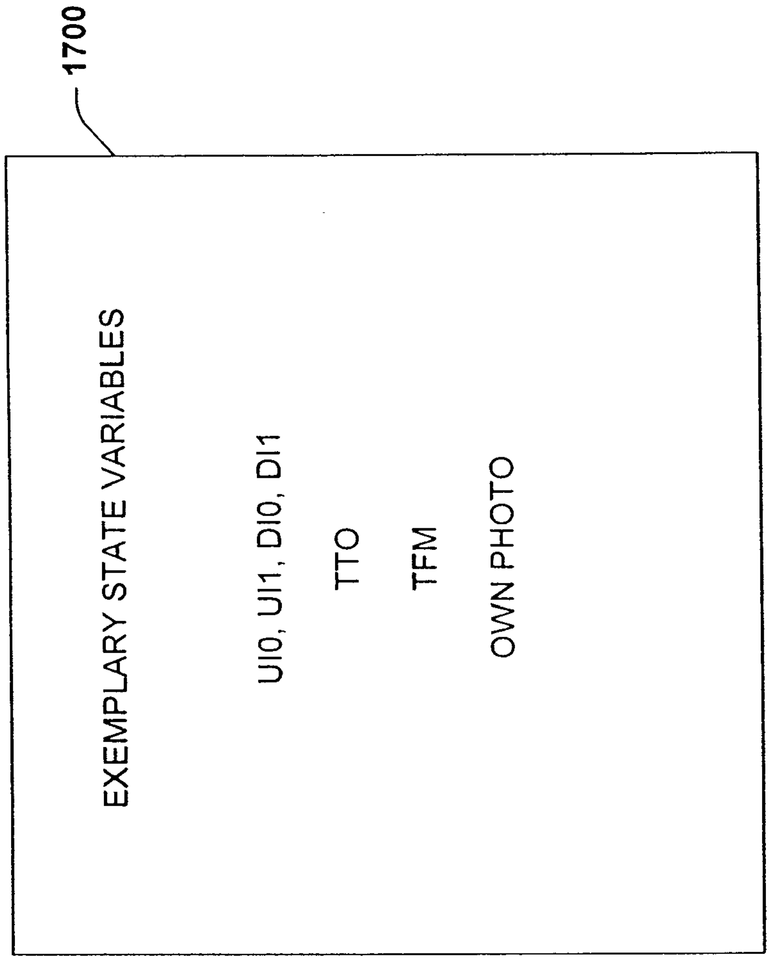
FIG. 17 is a state variable diagram for a zone control system in accordance with the present invention.

Before describing more detailed logic below, FIG. 17 illustrates typical state variables 1700 that are processed when making logic decisions for various modes described below. As noted above, this can include $UI_0$, $UI_1$, $DI_0$ and $DI_1$. This can include explicit state variables such as an own photo state or implicit state variables such as TTO and TFM which are described below.

TTO (Transition To Own zone—a load is coming)

Set to 1 when $UI_0$ transitions from 0 to 1 (blocked to unblocked)

Starts IN jam timer if running in single zone mode and jam detect is enabled

Cleared when IN jam timer times out or when own photo transitions from 1 to 0 (unblocked to blocked) while IN jam timer is running IN Jam timer is reset and turned off when own photo transitions from 1 to 0 (unblocked to blocked).

TFM (Transition From own zone—a load is sent out to downstream zone)

Set to 1 when own photo transitions from 0 to 1 (blocked to unblocked)

Cleared when OUT jam timer times out (if running) or when $DI_0$ transitions from 1 to 0 (unblocked to blocked).

The following tables and discussion describes various possible logic conditions for one or more of the previously described modes and/or features that relate to one or more of the state variables depicted in FIG. 17. The following tables illustrate:

Single Zone Logic For Type I And II Modules:

Logic notes: Photos are DO, sinking, output=0 when reflector blocked

TTO=1 if a load is in transit to own zone

TFM=1 if a load is in transit from own zone

Drive=1 causes drive current if “output invert” mode is off

| Up stream photo $UI_0$ | Load in transit to TTO | photo OWN | Load in transit from TFM | Down stream photo $DI_0$ | Drive | Comments |
|---|---|---|---|---|---|---|
| 0x | 0 | 0 | 0 | 0 | 0 | Condition C |
| 0 | 0 | 0 | 0 | 1 | 1 | Condition B |
| 0x | 0 | 0 | 1 | 0 | 0 | Condition C |
| 0x | 0 | 0 | 1 | 1 | 0 | Condition C |
| 0 | 0 | 1 | 0x | 0x | 1 | Condition A |
| 0 | 0 | 1 | 0x | 1x | 1 | Condition A |
| 0 | 0 | 1 | 1x | 0x | 1 | Condition A |
| 0 | 0 | 1 | 1x | 1x | 1 | Condition A |
| 0x | 1 | 0 | 0 | 0 | 0 | Condition C |
| 0x | 1 | 0 | 0 | 1 | 1 | Condition B |
| 0x | 1 | 0 | 1 | 0 | 0 | Condition C |
| 0x | 1 | 0 | 1 | 1 | 0 | Condition C |
| 0 | 1 | 1 | 0 | 0 | 1 | |
| 0 | 1 | 1 | 0 | 1 | 1 | |
| 0 | 1 | 1 | 1 | 0 | 1 | |
| 0 | 1 | 1 | 1 | 1 | 1 | |
| 1 | 0 | 0 | 0 | 0 | 0 | Condition C |
| 1x | 0 | 0 | 0 | 1 | 1 | Condition B |
| 1x | 0 | 0 | 1 | 0 | 0 | Condition C |
| 1x | 0 | 0 | 1 | 1 | 0 | Condition C |
| 1 | 0 | 1 | 0 | 0x | 0 | Condition D |
| 1 | 0 | 1 | 0 | 1x | 0 | Condition D |
| 1 | 0 | 1 | 1 | 0x | 0 | Condition D |
| 1 | 0 | 1 | 1 | 1x | 0 | Condition D |
| 1x | 1 | 0 | 0 | 0 | 0 | Condition C |
| 1x | 1 | 0 | 0 | 1 | 1 | Condition B |
| 1x | 1 | 0 | 1 | 0 | 0 | Condition C |
| 1x | 1 | 0 | 1 | 1 | 0 | Condition C |
| 1 | 1 | 1 | 0 | 0 | 1 | |
| 1 | 1 | 1 | 0 | 1 | 1 | |
| 1 | 1 | 1 | 1 | 0 | 1 | |
| 1 | 1 | 1 | 1 | 1 | 1 | |

x = don't care

Rules: A drive if upstream is blocked, no load coming and own zone empty

B drive if own zone full, no load in transit from own zone and downstream zone empty C Own zone full, downstream zone blocked or load is in transit from own zone D Upstream empty, no load in transit to own zone, own zone empty Dual Zone Logic For Type I And II Modules:

Logic notes: Photos are DO, sinking, output=0 when reflector blocked

Drive=1 causes drive current if "output invert" mode is off

| Down stream photo | Down stream photo | | Comments |
|---|---|---|---|
| $DI_0$ | $DI_1$ | Drive | |
| 0 | 0 | 0 | |
| 0 | 1 | 1 | |
| 1 | 0 | 1 | |
| 1 | 1 | 1 | |

Note:
Drive if downstream zone clear or if zone after that is clear

Jam Timing And Logic:

Out Jam

Out jam timer starts when:

| Up stream photo $UI_0$ | Load in transit to TTO | photo OWN | Load in transit from TFM | Down stream photo $DI_0$ | Drive | Comments |
|---|---|---|---|---|---|---|
| x | x | 0 | x | x | 0 → 1 | |

AND running in single zone mode and jam detect is enabled.

Out jam timer resets when own photo transitions 0→1

If out jam timer times out, enter jam mode own drive is set to 0 and $DO_1$ is set to 1. This stops own drive and the next drive downstream.

wait until own photo transitions 0→1 then

A) if $DI_0$=0 (downstream eye blocked) for three seconds, set TFM to 0, set $DO_1$ to 0 (release downstream zone from sleep) and exit jam mode to normal logic B) if own eye transitions twice in 1S or less, set TFM to 0, set $DO_1$ to 0 (release downstream zone from sleep) and exit jam mode to normal logic other cases—do nothing.

Notes on Sleep Logic:

Exiting from sleep under any circumstances results in an awakened zone setting own drive to 1 for 5S before returning to transport logic.

Case A occurs when the jammed box is moved to the next downstream photo and case B occurs when a jammed box or object is removed.

The utilization of a sleep enable line to stop a downstream drive when a jam occurs at an upstream photo is a logic technique to minimize communications. The use of a sleep signal during jam generally implies that sleep mode and jam mode be exclusive. Thus, one mode may not be entered unless the other mode has terminated.

Logic:

IN jam timer starts when UL transitions 0→1

AND running in single zone mode and jam detect is enabled.

IN jam timer resets when own photo transitions 1→0

If IN jam timer times out, enter jam mode own drive is set to 0. This stops own drive.

wait

A) If Own photo=0, set TTO to 0 and exit jam mode to normal logic other cases—do nothing.

Sleep Logic:

Going to sleep $UI_1$ AND own photo=1 causes own drive to be set to 0 and TTO to be set to 0

Waking up

When $UI_1$=0, the zone wakes up to normal logic

Note:

Enabling Sleep Downstream:

own photo=1 AND TFM=0 AND TTO=0 starts sleep timer any other states reset sleep timer and turn it off If sleep timer times out, $DO_1$ is set to 1

$DO_1$ is cleared when own photo returns to 0 (blocked)

Slug Release:

Slug is set by dipswitch and is optional for a single contiguous group of zones including the master zone. Master module external slug line (screw terminals) transition from open to closed contacts (V plus to zero) and starts a non-retriggerable one shot slug timer in the master. The master asserts the slug control output (in the flat cable) and each type I, or II or III zone controller with slug enabled will turn on own drive, wait 50 mS then pass the slug signal on to the next zone.

When the slug timer is timed out AND the master module external slug line is open, the master will remove the slug control output from the flat cable and each type I, II or III module, if slug is enabled by dipswitch, will sequentially clear implied state variables TTO and TFM, then turn off its drive, wait 50 mS and then remove the slug signal to the next zone. Modules with slug disabled by dipswitch will ignore the slug signal on the flat cable and will not pass it upstream.

Zone Release:

Zone release only affects the type IV (master)—all other zones continue to process transport logic. The on delay for zone release is active for both counting and one shot timing. The external zone release (screw terminal) contact transition from open to closed (V plus to zero) starts an ON delay which in turn triggers the non-retriggerable one shot zone release timer and actuates drive. If, during timing, the zone release switch transitions open to closed a second time, the zone release one-shot timer is terminated as if it had timed out. After the one shot times out, the drive turns off, unless the contacts are still held closed, in which case the drive remains running until the contacts open. If the one shot is set to zero, this logic will respond as if the one-shot had been set to a nonzero value and timed out. In other words, if the one shot is set to zero, the drive will actuate when the contact closes and remain running until the contacts are released. If a non-zero zone release counter value is selected, counting is enabled. If a non-zero one-shot timer value is then set, the module resets the counter value to zero. If a non-zero zone release one-shot timer value is selected, timing is enabled. If a non-zero counter value is then set, the module resets the one-shot timer value to zero. Both are disabled by selecting a zero for both.

Counting:

Type IV (master) drive is actuated and preset count is decremented by 1 on each 0 to 1 (blocked to unblocked) transition of own photo. Type IV (master) reverts to standard transport and accumulation logic when count reaches zero. Count remains active through sleep cycles and power down cycles. Count is reset to zero when zone release switch transitions open to closed a second time.

Additional Master Logic:

Logic notes: Photos are DO, sinking, output=0 when reflector blocked

TTO=1 if a load is in transit to own zone

Drive=1 causes drive current if "output invert" mode is off

| Up stream photo | Load in transit to | photo | | Comments |
|---|---|---|---|---|
| $UI_0$ | TTO | OWN | Drive | |
| 0 | 0 | 0 | 0 | |

-continued

| Up stream photo | Load in transit to | photo | | Comments |
|---|---|---|---|---|
| 0 | 0 | 1 | 1 | |
| 0 | 1 | 0 | 0 | |
| 0 | 1 | 1 | 1 | |
| 1 | 0 | 0 | 0 | |
| 1 | 0 | 1 | 0 | |
| 1 | 1 | 0 | 0 | |
| 1 | 1 | 1 | 1 | |

All other conditions drive = 0

Dual Zone Logic:

In dual zone logic, the type IV (master) drives when TTO=1. In the type IV (master) module, the on delay typically operates only with transport logic. The state of the nonexistent "zone" downstream of the type IV master is dummied in as 0 (blocked) so that the zone upstream of the type IV master has correct input for the dual zone logic. The zone full output follows its own photoeye (when own eye is blocked, zone full output actively sinks).

Additional Type III Zone Specific Logic:

Single Zone Logic

Logic notes: Photos are DO, sinking, output=0 when reflector blocked

TFM=1 if a load is in transit from own zone

Drive=1 causes drive current if "output invert" mode is off

| photo | Load in transit from | Down stream photo | | Comments |
|---|---|---|---|---|
| OWN | TFM | $DI_0$ | Drive | |
| 0 | 0 | 1 | 1 | |

All other conditions, drive = 0

Dual zone logic for type III is similar to type I and II logic. The type III module is typically the first module (most upstream) in the system. It has an external product fill switch that operates as follows:

When fill switch is closed, input voltage goes to a near zero value and this transition causes own drive to actuate until either the switch is released and closed a second time or when own eye goes to 0 (blocked). When own eye is blocked, the switch is ignored and logic decides if the actuator should drive. The zone full output follows own photo-eye (when own eye is blocked, zone full output actively sinks).

Figure 18:
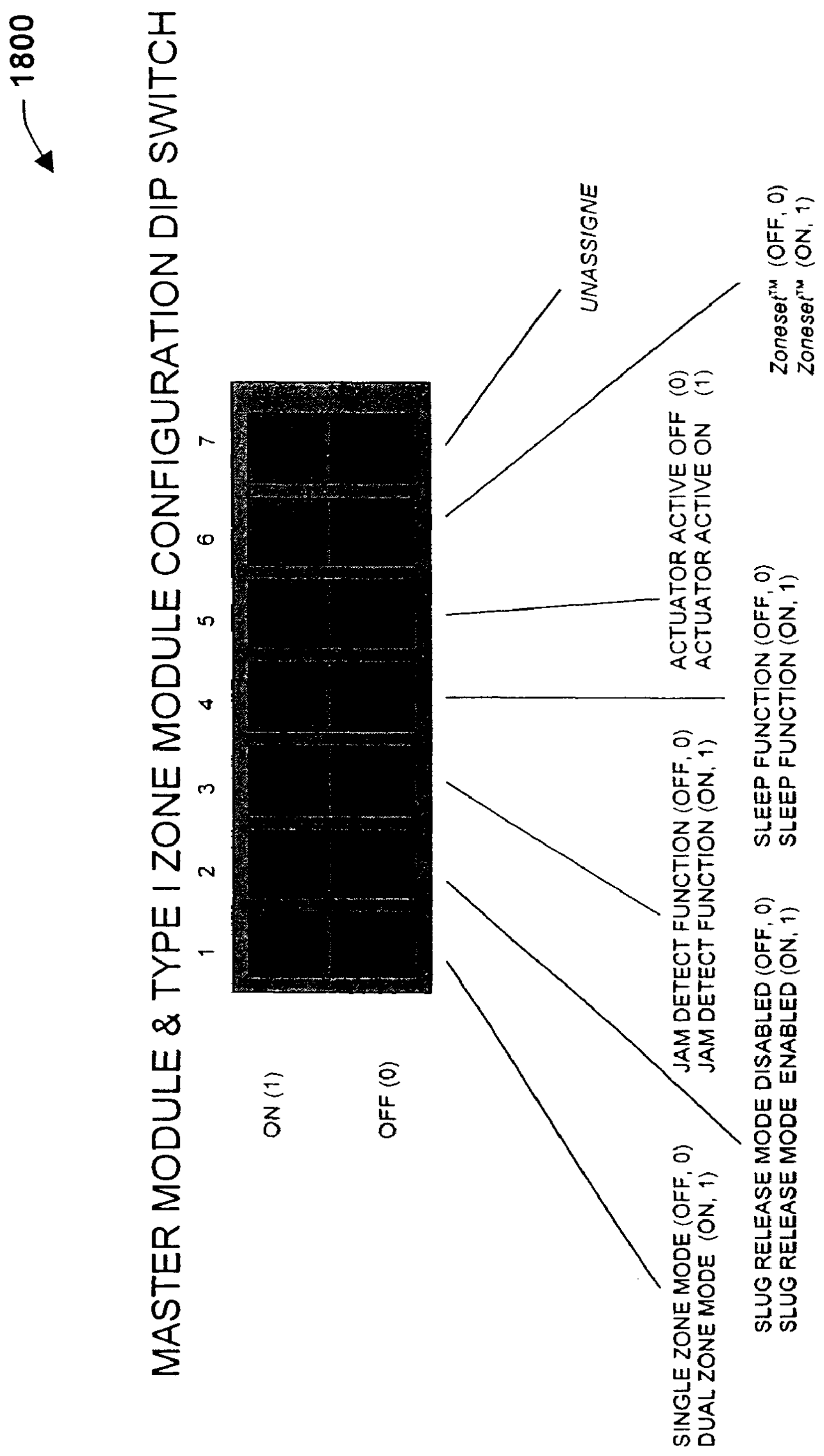
FIGS. 18 through 21 are an input diagram illustrating user interface aspects in accordance with the present invention.

Referring now to FIGS. 18 through 21, exemplary configuration settings are illustrated in accordance with an aspect of the present invention. A switch diagram 1800 in FIG. 18 illustrates various settings for master mode and type I zone configurations. These settings include single and dual mode settings at position 1, slug release settings at position 2, jam detect functions at position 3, sleep functions at position 4, actuator settings at position 5, replication settings at position 6, and an unassigned setting at position 7.

Figure 19:
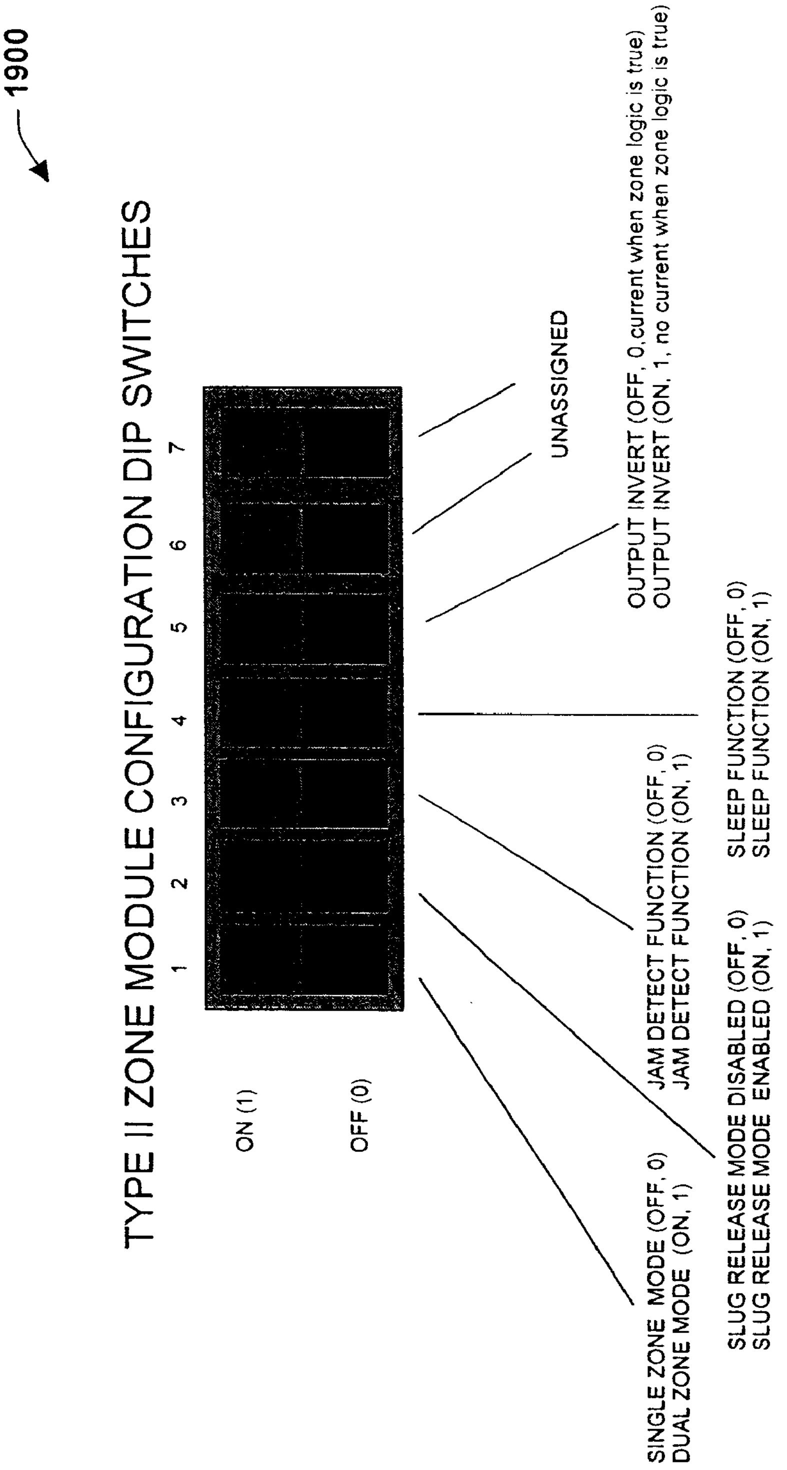

A switch diagram 1900 in FIG. 19 illustrates various settings for type II zone configurations. These settings include single and dual mode settings at position 1, slug release settings at position 2, jam detect functions at position 3, sleep functions at position 4, output invert settings at position 5, and an unassigned setting at positions 6 and 7.

Figure 20:
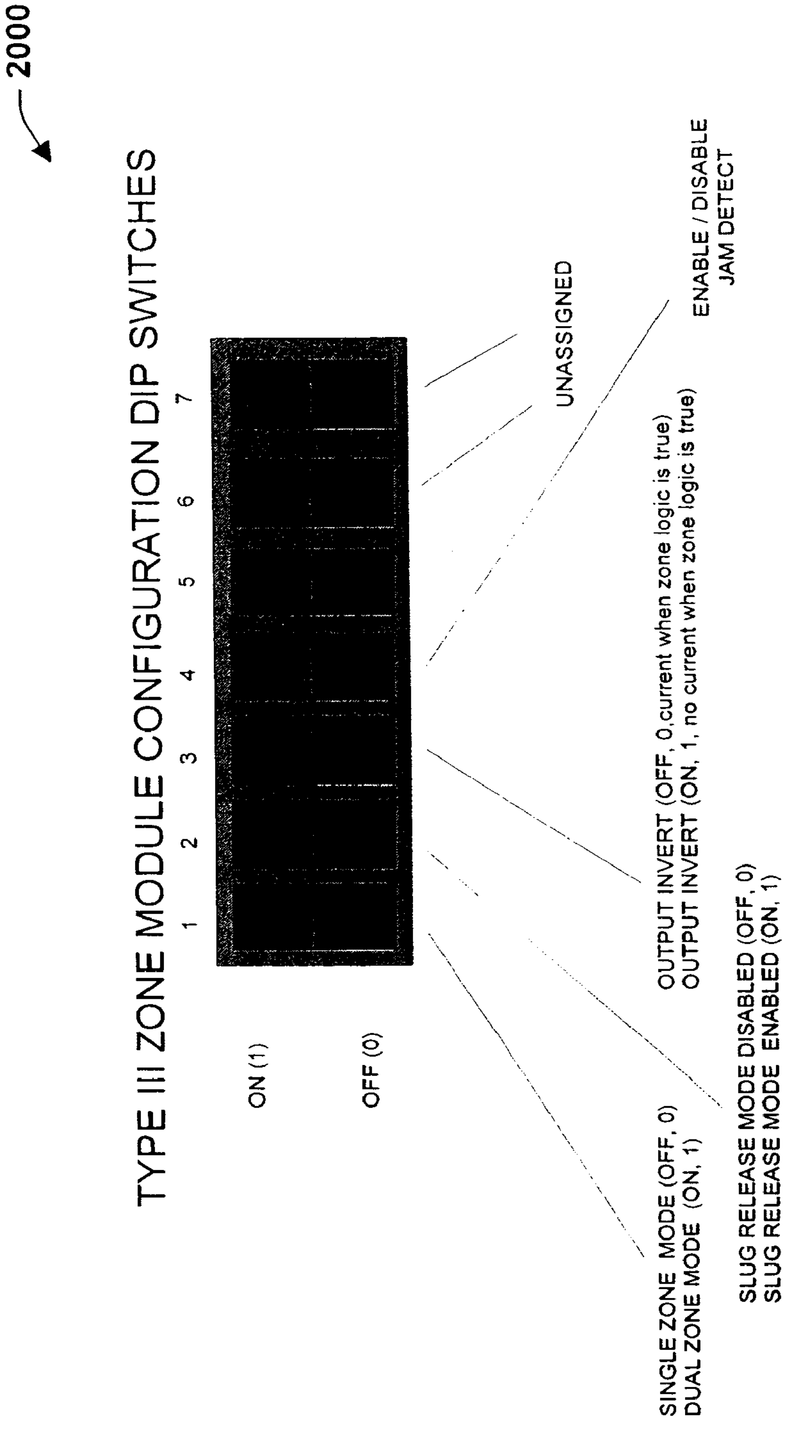

A switch diagram 2000 in FIG. 20 illustrates various settings for type III zone configurations. These settings include single and dual mode settings at position 1, slug release settings at position 2, output invert settings at position 3, and an unassigned setting at positions 4 through 7, one of which may optionally be assigned to enable or disable the jam detect function.

Figure 21:
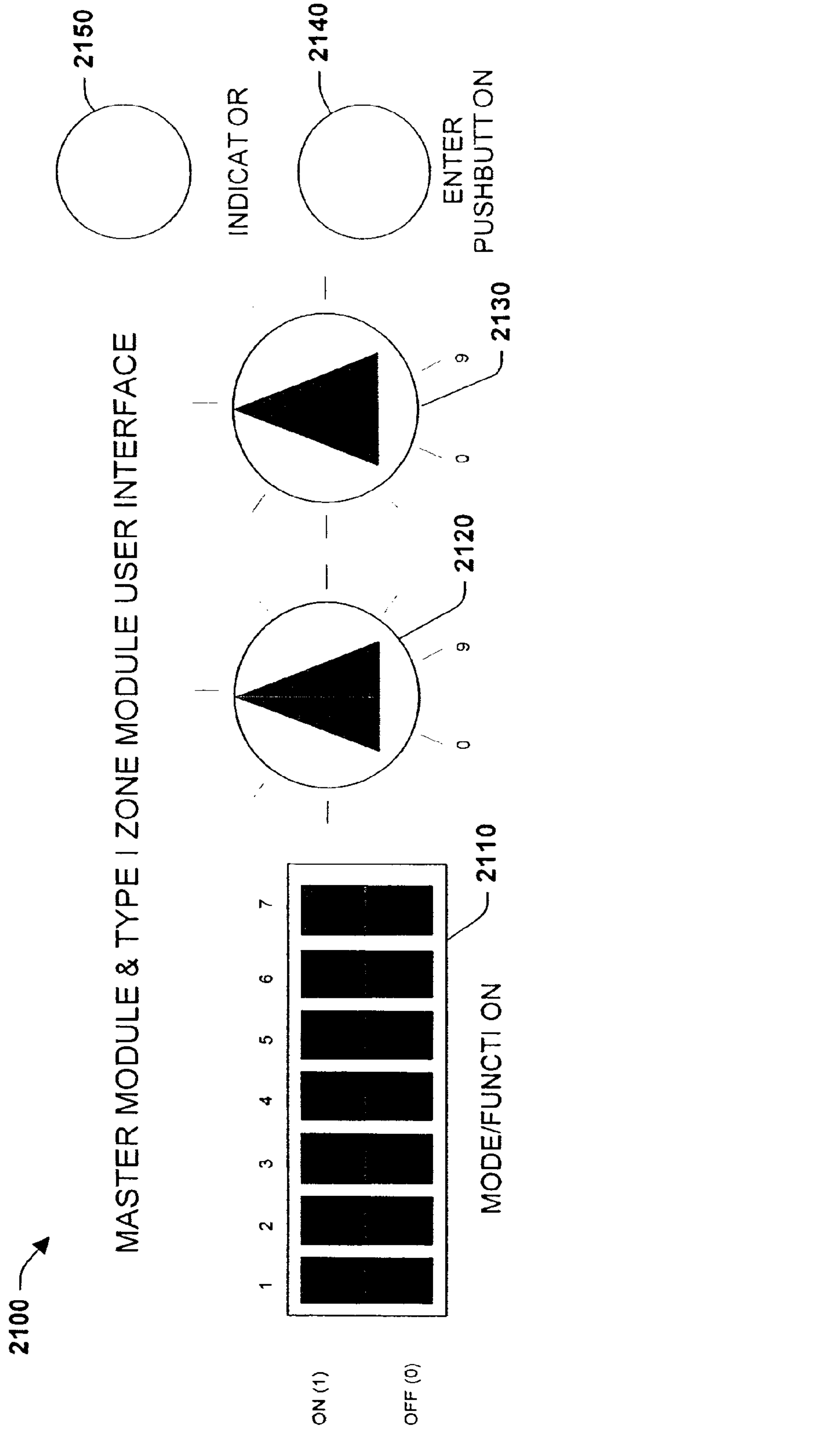

A switch diagram 2100 in FIG. 21 illustrates various settings for master mode and type I zone configurations. A dipswitch 210 can be provided for mode/function configurations, rotary switches 2120 and 2130 provide timer or counter values, an enter pushbutton 2140 can be utilized as described above in relation to FIG. 6, and an LED 2150 can be provided as a user interface output. The following table lists possible configuration options:

| ITEM | SWITCH POSITION 2120 |
|---|---|
| ON | 0 |
| OFF | 1 |
| SLEEP | 2 |
| JAM | 3 |
| ZONE RELEASE ONE SHOT* | 4 |
| ZONE RELEASE ON DELAY* | 5 |
| ZONE RELEASE COUNT* | 6 |
| SLUG RELEASE ONE SHOT* | 7 |
| SLUG RELEASE ON DELAY* | 8 |
| FACTORY RESET | 9 |

*used in master module

| VALUE | SWITCH POSITION 2130 |
|---|---|
| 0 S OR 0 COUNT | 0 |
| 0.5 S OR 1 COUNT | 1 |
| 1.0 S OR 2 COUNT | 2 |
| 1.5 S OR 3 COUNT | 3 |
| 2.0 S OR 4 COUNT | 4 |
| 2.5 S OR 5 COUNT | 5 |
| 5.0 S OR 6 COUNT | 6 |
| 10 S OR 7 COUNT | 7 |
| 15 S OR 8 COUNT | 8 |
| 20 S OR 9 COUNT | 9 |

Figure 22:
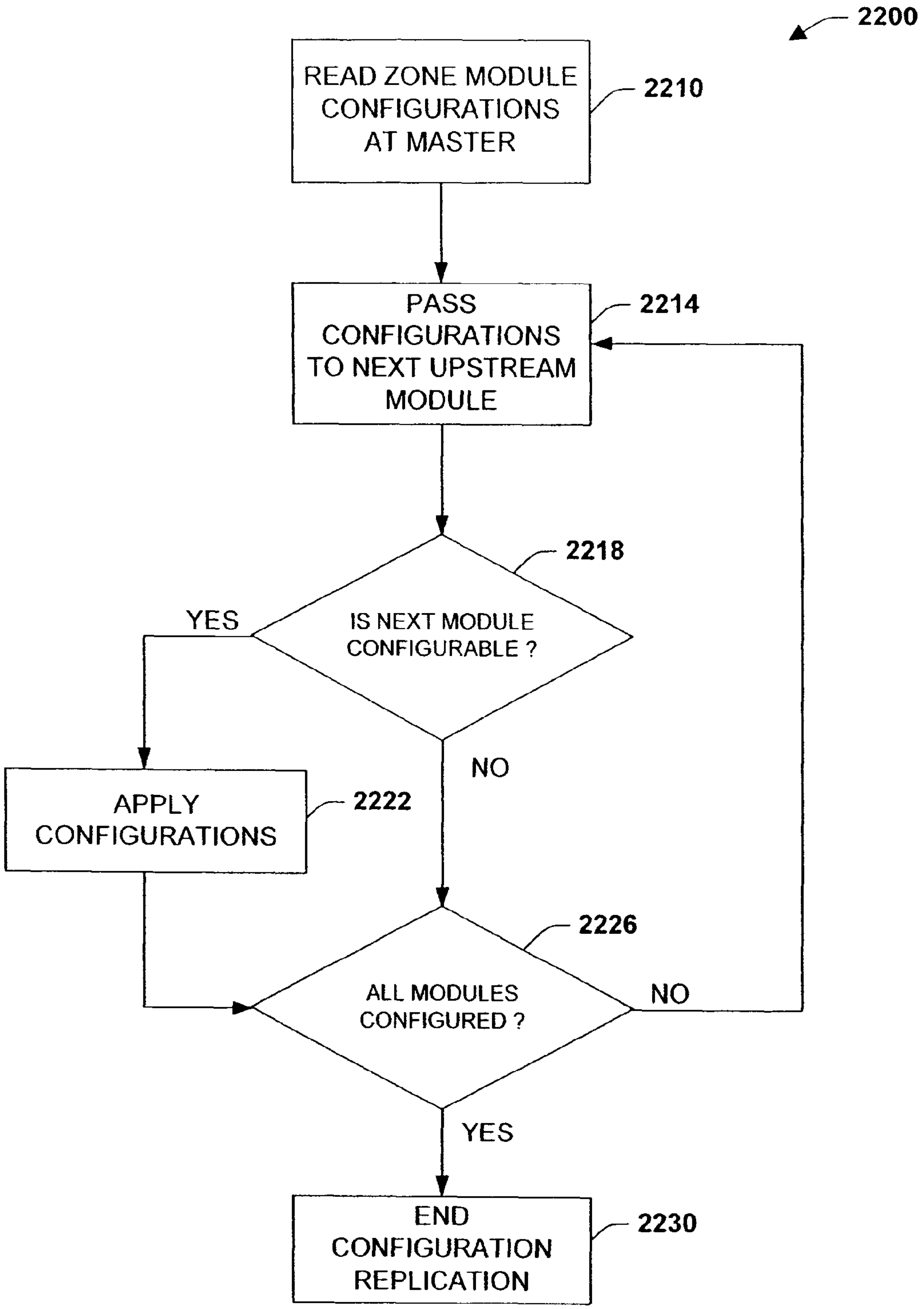
FIGS. 22 and 23 are flow diagrams representing zone control processes in accordance with the present invention.
Figure 23:
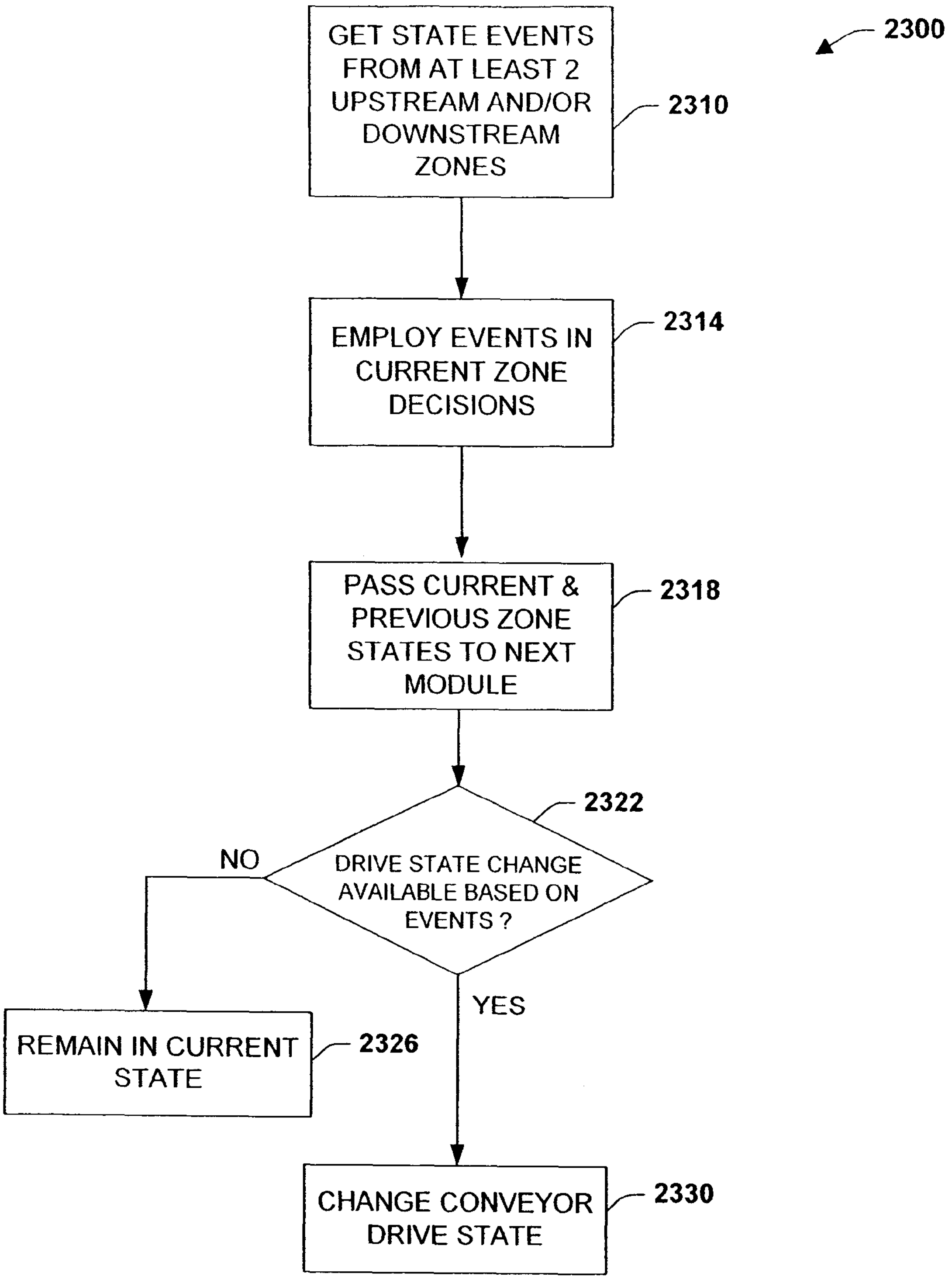

FIGS. 22 and 23 illustrate zone control methodologies in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 22 illustrates a methodology 2200 to facilitate zone module configuration and replication in accordance with an aspect of the present invention. At 2210, zone module configurations are read. As described above, configurations may be manually and/or automatically provided to a zone module. At 2214, configurations are passed to the next upstream zone module. At 2218, a determination is made as to whether the next module is a configurable module. If so, configurations are applied to the module at 2222 and the process proceeds to 2226. If the next module is not configurable at 2218, the process proceeds to 2226. At 2226, a determination is made as to whether all modules have been configured. This can include passing state information between modules, broadcasting messages, and/or waiting for a predetermined length of time before a response is received. If all modules have been configured at 2226, the replication process ends at 2230. If all modules have not been configured at 2226, the process proceeds back to 2214, wherein further configurations are attempted with other zone modules upstream.

Referring to FIG. 23, a process 2300 illustrates a multi-zone decision process in accordance with an aspect of the present invention. At 2310, at least two state events are retrieved from at least two adjacent upstream and/or downstream zones. These events can be passed from module-to-module in a serial manner, and/or can be passed in a parallel manner between modules. At 2314, the received events of 2310 are employed in a current zone decision. At 2318, current zone states and previous zone states are passed to the next upstream and/or downstream module. At 2322, a decision is made as to whether a drive state change should occur based on the received events. If not, drive state remains in its current state at 2326 (e.g., motor/actuator output off or on). If a state change is determined at 2322, then the drive state for a zone module employing the process 2300 is changed from its current state (e.g., go into sleep mode if no new product coming from upstream, go into jam mode if product determined to be stopped downstream).

Figure 24:
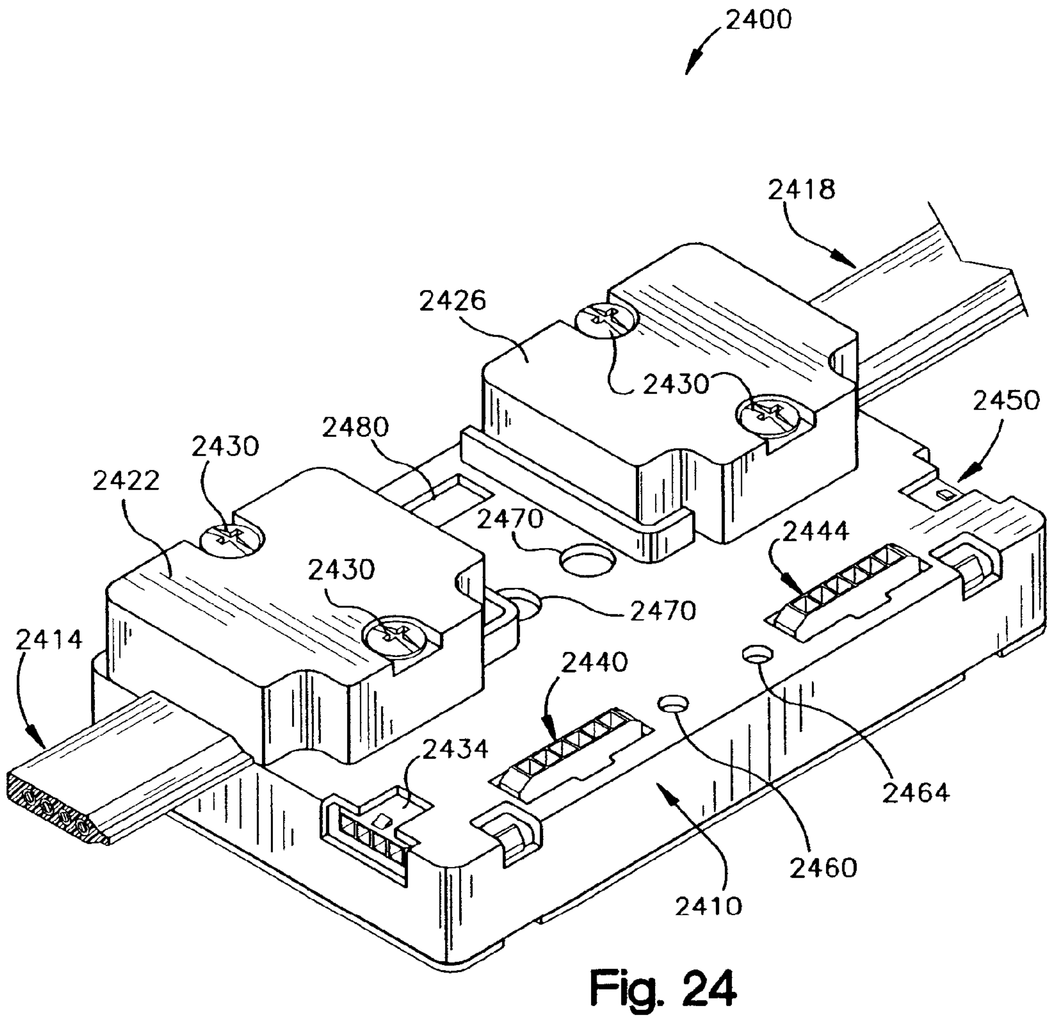
FIG. 24 is a diagram illustrating a top view of zone module packaging in accordance with the present invention.

Referring now to FIG. 24, a diagram illustrates a top view of a zone module 2400 and associated packaging in accordance with an aspect of the present invention. The zone module 2400 can be packaged in a molded plastic housing 2410 having various holes and cut-outs to support a plurality of different type pins, connectors, switches, pushbuttons, lights or LED's, and/or other type access such as for ventilation. The housing 2410 and associated assemblies provide a low-profile and compact construction which facilitates installation within a conveyor rail and is illustrated in more detail below in FIG. 27. The location and configuration of ports, connectors, cables, and interfaces on the front and sides of the housing 2410 supports a plug and play type installation environment providing efficient systems access and assembly. Thus, zone modules adapted in accordance with the present invention can be rapidly connected for new installations and conveniently added, removed, and/or programmed in accordance with existing conveyor lines.

It is noted that respective cut-outs depicted can be provided with a knock-out covering, such that if a feature is not employed for a respective zone module type, then the knock-out covering can remain intact, thus substantially covering non-utilized openings. A cut flat cable trunk line is illustrated at 2414 and 2418 that can be mated to vampire pins (illustrated below) via clamping components 2422 and 2426. As illustrated, screws 2430 can be employed through the clamping components 2422 and 2426 to secure the flat cable to the housing 2410 and associated vampire pins described below. It is further noted that more or less screws 2430 can be employed, wherein the screws can mate to nuts (shown below) molded into the housing 2410 or alternatively, taper into the housing via tapered/self-tapping threads.

The housing 2410 can include several receptacle and/or user interface locations. For example, an actuator port 2434 (e.g., female connector or receptacle) can be provided supporting multiple actuator types, the port including voltage inputs (e.g., 24 VDC) and current/voltage output's to drive the actuator (e.g., TTL, NPN, PNP, FET). An external port 2440 or receptacle can be employed to support zone release and stop signals, slug input/output signals, and zone state output signals. A commissioning port 2444 facilitates external zone module programming such as from an operator terminal or configuration device, and supports test mode connections (in parallel to vampire connections), wherein zone modules may be factory tested via the commissioning port without employing the flat cable 2414 and 2418, if desired. A sensor port 2450 or receptacle supports two and three-wire (or more) sensor types and includes voltage power inputs and current or voltage sensing inputs (e.g., 45 ma current input). At various locations on/through the housing 2410, user interface components can be provided that can be positioned in substantially any suitable location on or through the housing. This can include one or more pushbuttons illustrated at 2460, one or more light or LED ports at 2464, and one or more switches (e.g., rotary, dipswitch) at 2470 and 2480, respectively. As noted above, knock-out coverings can also be provided to cover unused interface or port options in the housing 2410—depending on the zone module type configured or selected.

Figure 25:
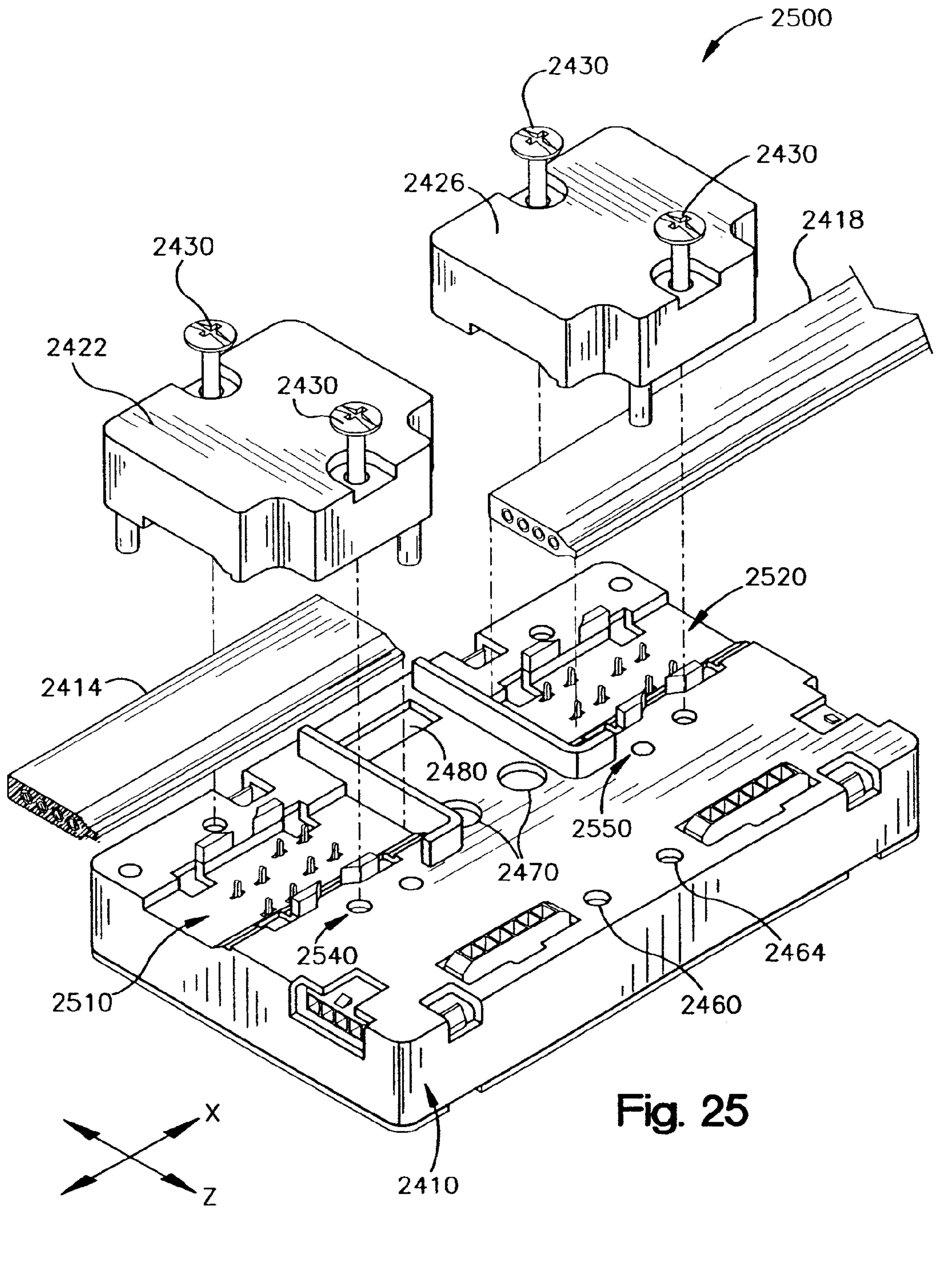
FIG. 25 is a diagram illustrating a view of cable installation and vampire connections in accordance with the present invention.

FIG. 25 is a diagram illustrating a view 2500 of cable installation and vampire connections in accordance with the present invention. If a four-conductor flat cable 2414 and 2418 is selected, four sets of paired vampire pins are provided for cable mating per conductor. For example, at 2510, paired pins are vertically aligned (per pair along X-axis) in a row to provide two mating points per conductor. It is to be appreciated that more or less vampire pins/sets can be provided per conductor or cable size, if desired. As illustrated, at 2510 and 2520, the paired vampire pins are staggered horizontally along a Z-axis to mate with separate conductors of the flat cable 2414 and 2418. The clamping components 2422 and 2426 force the flat cable onto the pins at 2510 and 2520 via the screws 2430, wherein the insulation of the cable is pierced to form a connection with the conductor. As illustrated, the screws 2430 travel through the housing at 2540 and 2550 in order to fasten with embedded nuts described and illustrated below.

Figure 26:
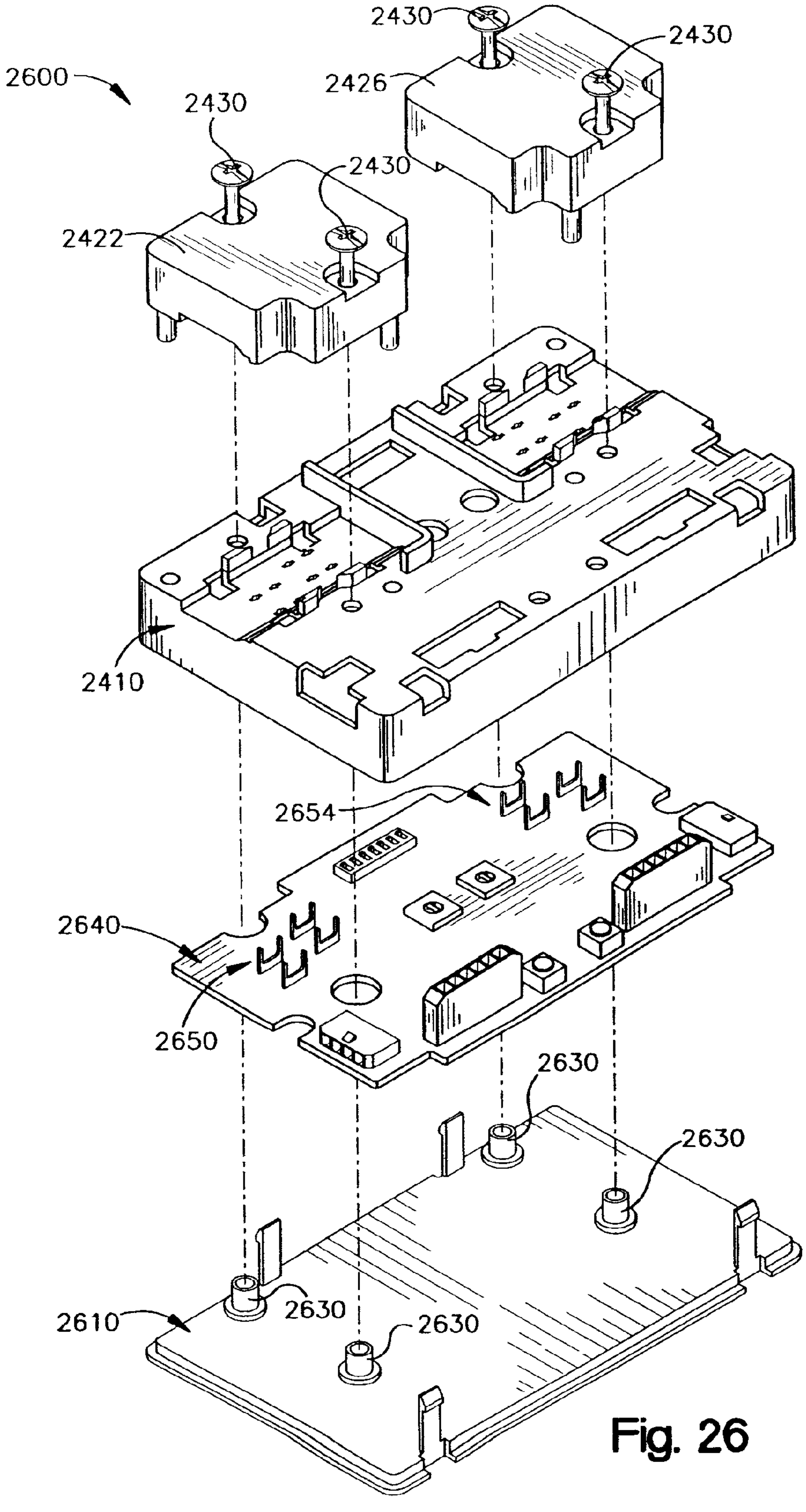
FIG. 26 is a diagram illustrating zone module construction layers in accordance with the present invention.

FIG. 26 is a diagram illustrating zone module construction layers 2600 in accordance with the present invention. The various layers depicted at 2600 can be snap or compression fit, if desired, or fastened by substantially any process such as via screws or adhesive, for example. As illustrated, clamping components 2422 and 2426 and associated screws 2430, are mounted on top of the housing 2410, the housing having various openings for receptacles, pins, connectors, screw holes, lights, and switches, wherein the screws mate to a bottom assembly 2610, having associated mating portions 2630 for receiving the screws 2430. A printed circuit board 2640 supports logic, input, output, communications, ports and user interface aspects described previously including vampire pins at 2650 and 2654, respectively.

Figure 27:
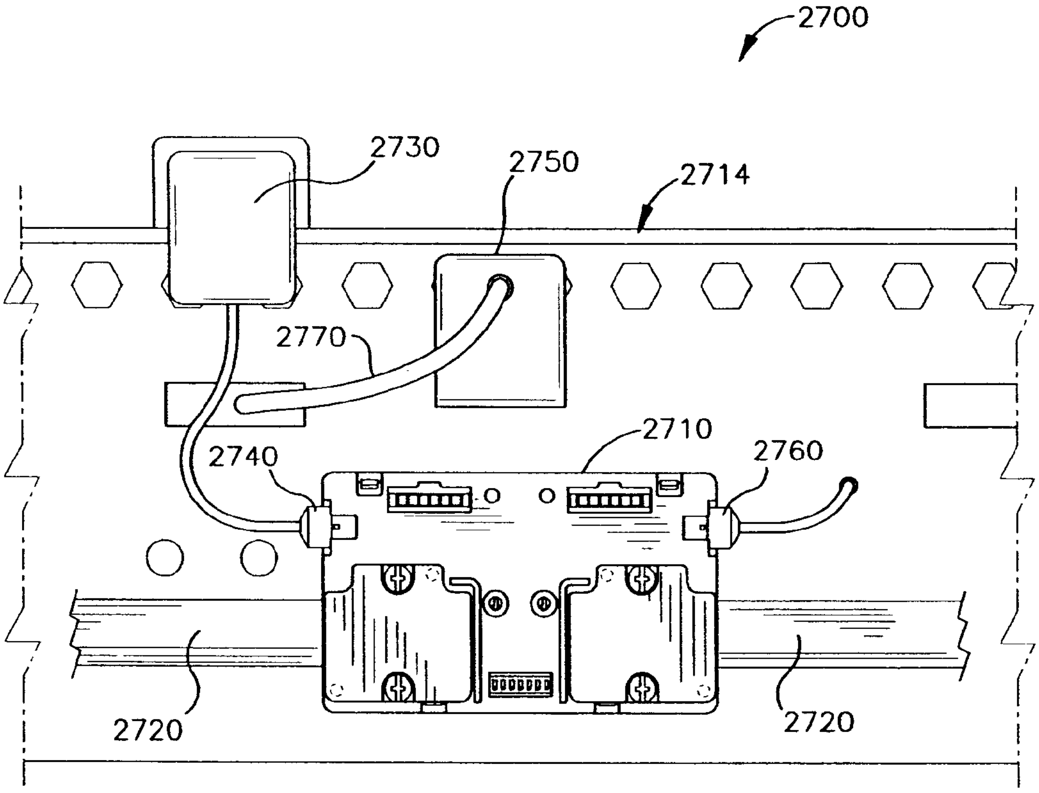
FIG. 27 is a diagram illustrating a side view of an installed zone module in accordance with the present invention.

FIG. 27 is a diagram illustrating a side view 2700 of an installed zone module 2710 in accordance with the present invention. A portion of a conveyor section 2714 is illustrated that can be coupled to a plurality of upstream and/or downstream sections (not shown). The zone module 2710 is operatively coupled to a flat cable 2720 that can be run along the conveyor section 2714 and to other adjoining conveyor sections, if necessary. An input sensor 2730 for detecting conveyor objects, inputs a signal at receptacle 2740 of the zone module 2710. An actuator component 2750 receives output commands from the zone module 2710 at port 2760 in order to move or stop the conveyor section 2714. It is noted that a cable 2770 from the actuator 2750 (or other cables) may loop inside the conveyor section 2714 before arriving at the port 2760. As noted above, the installed zone module 2710 fits within the conveyor section 2714 in a low-profile, compact manner, whereby input/output cables can be readily coupled to ports 2740 and 2760. In addition, the present invention facilitates rapid installment of the cable 2720 to adjacent modules (not shown) via clamping components and pins described above. As illustrated in FIG. 27, interfaces such as connectors, switches, pushbuttons, and output indicators described previously can be readily and conveniently accessed from the front of the zone module 2710.

Thus, as depicted in FIG. 27, the zone module 2710 provides a housing sized for positioning within the conveyor rail 2714. A receptacle connected to the housing receives at least one line in communication with an adjacent module and a sensor port connected to the housing can be adapted to receive sensor input, wherein a user interface connected to the housing conveys operational information, and a logic system positioned within the housing can be electrically connected with the receptacle, sensor port and user interface.

Figure 28:
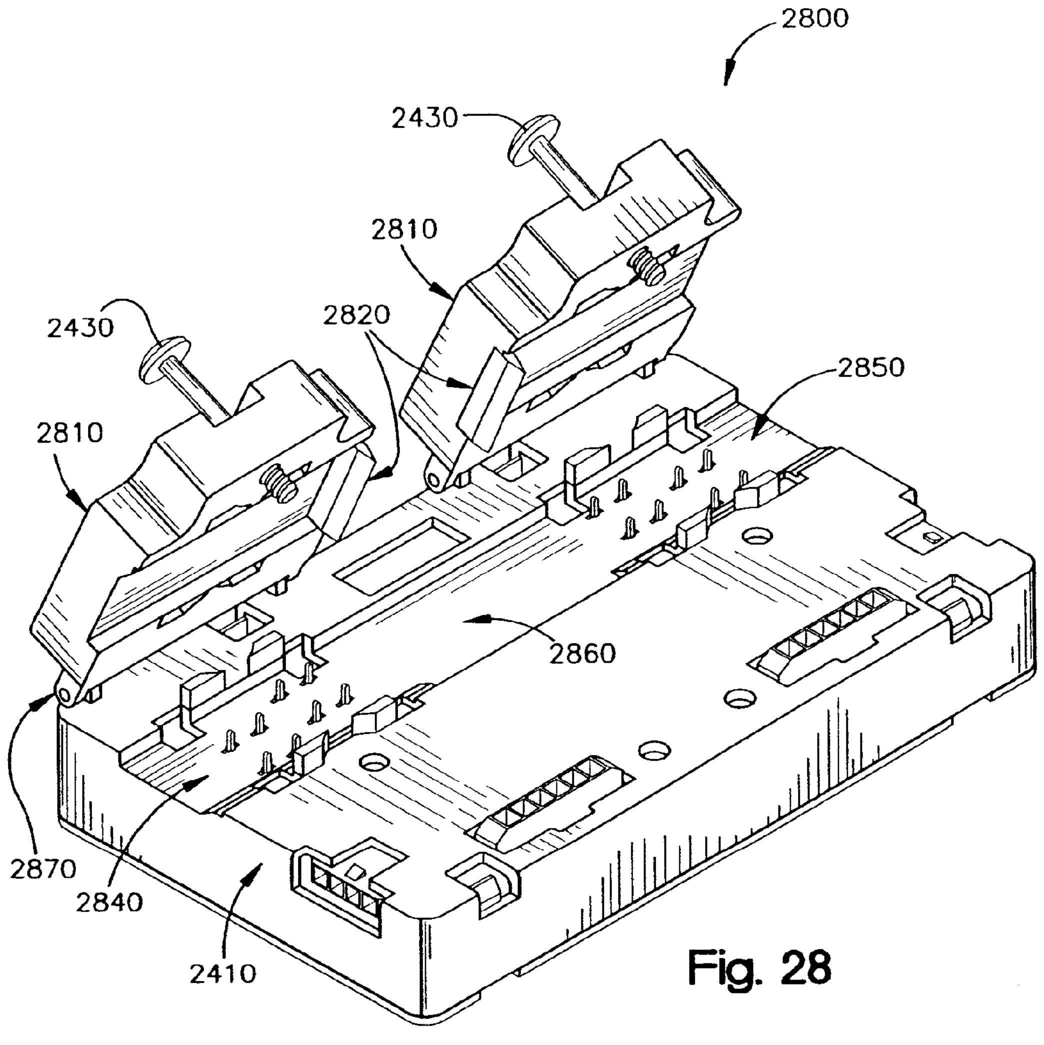
FIG. 28 is a diagram illustrating a zone module clamping component and cutting blade in accordance with the present invention.

FIGS. 28-32 illustrate alternative packaging/installation concepts in accordance with the present invention. FIG. 28 is a diagram 2800 illustrating zone module clamping components 2810 and associated cutting blades 2820 to facilitate a process wherein the flat cable described above can be installed and cut in a concurrent manner. As the screws 2430 are fastened, the flat cable (shown above) can be severed by the cutting blades 2810, while also making connections with the vampire pins at 2840 and 2850. A grooved portion 2860 can be provided in the housing 2410 to accommodate the cutting process. It is also noted, that hinges 2870 can be provided (also in accordance with previously described aspects), if desired, thus saving from providing additional fastening screws 2430.

Figure 29:
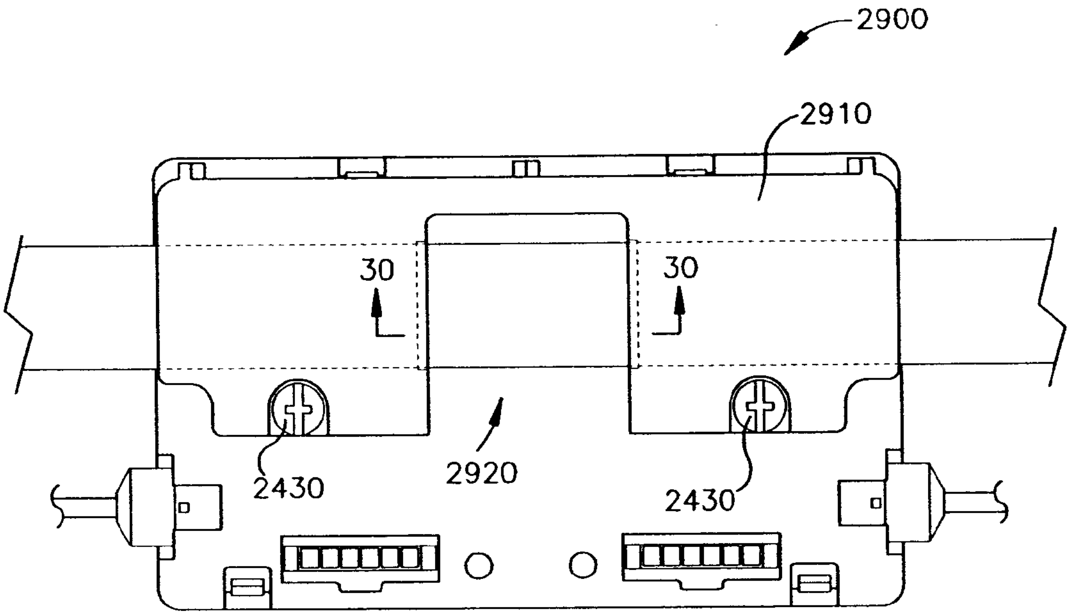
FIG. 29 is a diagram illustrating an alternative clamping component in accordance with the present invention.
Figure 30:
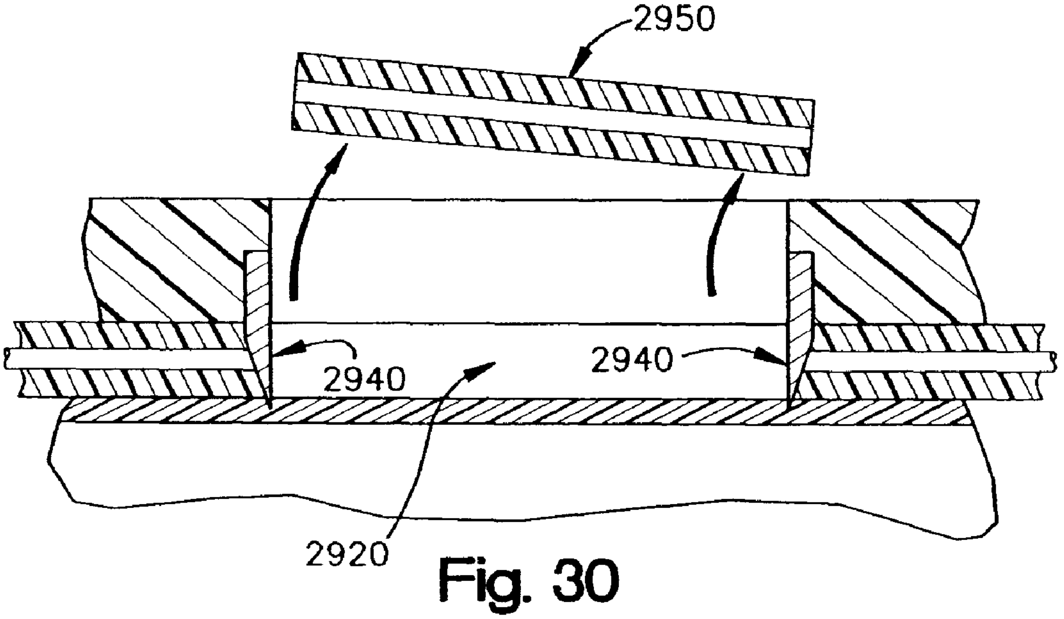
FIG. 30 is a diagram illustrating clamping component blades in accordance with the present invention.
Figure 31:
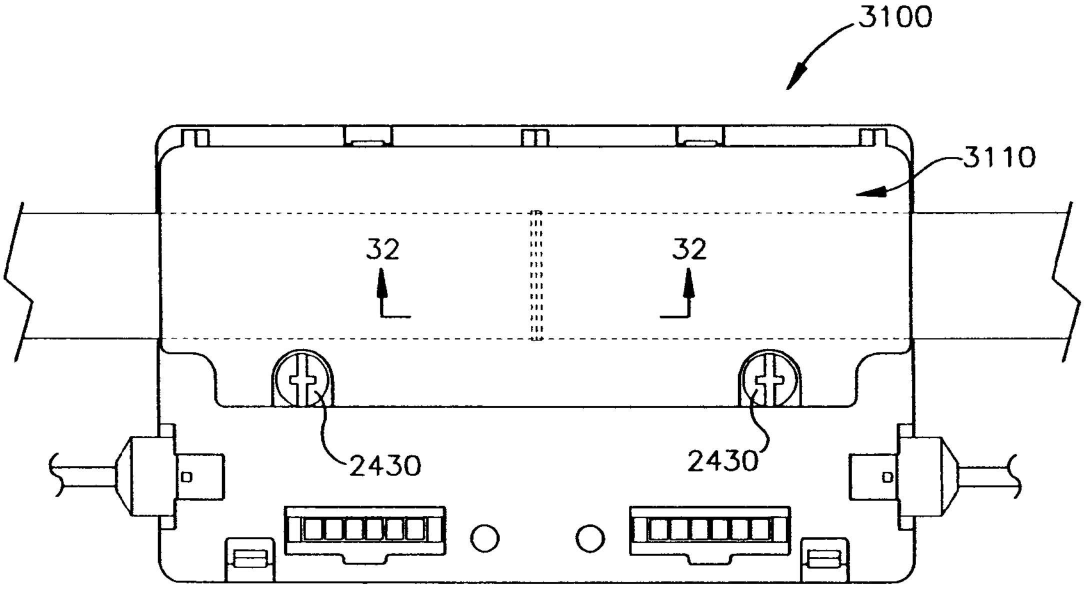
FIG. 31 is a diagram illustrating a solid top view of a clamping component in accordance with the present invention.
Figure 32:
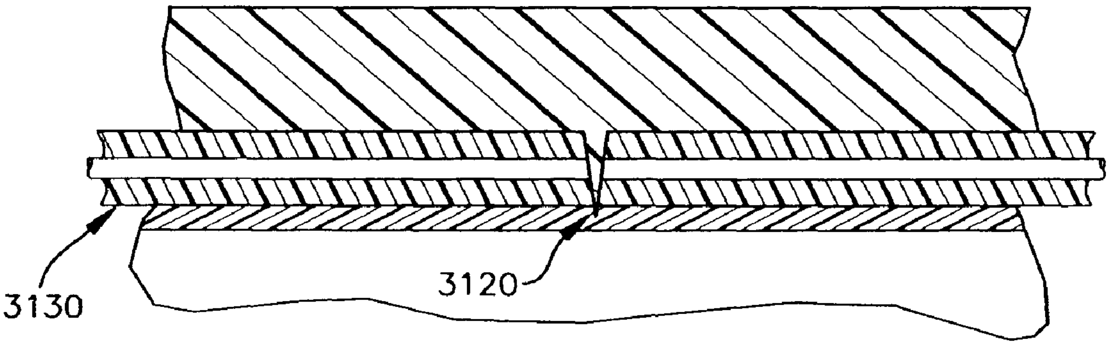
FIG. 32 is a diagram illustrating a side view of an alternative clamping component in accordance with the present invention.

FIG. 29 is a diagram 2900 illustrating an alternative clamping component 2910 in accordance with the present invention. The clamping component 2910 is a single clamping-cover design, depicted having a cut-out portion at 2920 for removing cable. As screws 2430 are fastened, blades 2940 illustrated in FIG. 30 sever a cable portion 2950 that can subsequently be removed from the cut-out portion 2920. FIG. 31 is a diagram 3100 illustrating a single clamping component 3110 that does not provide the cut-out portion 2920 illustrated above. In this aspect, the clamping component 3110 includes a single, non-conductive blade 3120 (e.g., plastic blade, coated blade) illustrated as a side view in FIG. 32. When screws 2430 are fastened as illustrated in FIG. 31, the blade 3120 severs a cable 3130 as illustrated in FIG. 32. Since the blade is non-conductive, the cable 3130 can be severed without removing a substantial portion of the cable, yet still provide electrical isolation between severed portions of the cable.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A conveyor system for moving a plurality of objects, the conveyor system comprising:

a plurality of conveyor zones including motors, sensors and control modules, each conveyor zone having a motor, a sensor and a control module associated therewith;

at least a first control module configured to receive at least one wireless message directly from all other control modules comprising a plurality of upstream and downstream control modules associated with the plurality of conveyor zones, to receive sensor inputs from the sensors of the plurality of conveyor zones, to determine direct states of the plurality of conveyor zones, to determine implied states of the plurality of conveyor zones and to transmit outputs to the motors of the plurality of conveyor zones to signal the motors to drive a respective conveyor zone of the plurality of conveyor zones, the outputs determined according to the direct states, implied states and the wireless messages received directly from the plurality of upstream and downstream control modules including non-adjacent control modules, wherein at least a second control module automatically configures all other zone modules, and wherein at least a third control module is manually configured through a user interface.

2. The conveyor system of claim 1, wherein the at least one wireless message is in accordance with a Bluetooth protocol or a Wireless Markup Language.

3. The conveyor system of claim 1, wherein the at least one wireless message comprises a configuration message.

4. The conveyor system of claim 3, wherein the configuration message relates to a slug mode.

5. The conveyor system of claim 1, wherein the at least one wireless message comprises a state event.

6. The conveyor system of claim 1, wherein the at least one wireless message comprises a sleep enable.

7. The conveyor system of claim 1, wherein the control modules are configured to wirelessly communicate with each other.

8. The conveyor system of claim 1, wherein the sensor comprises a photoeye.

9. The system of claim 1, wherein flat cable media with vampire style pins are employed to drive actuators associated with the plurality of conveyor zones.

10. The system of claim 1, wherein an object is implied to be between the sensors if the object leaves a first conveyor zone and does not arrive at a second conveyor zone.

11. The system of claim 1, wherein one of the plurality of conveyor zones enters a sleep mode based upon input from at least one upstream control module associated with the plurality of conveyor zones.

12. A conveyor controller, comprising:

a sensor port to receive an input from a sensor about the presence of an object in a first conveyor zone associated with a first conveyor controller among a plurality of conveyor controllers;

a receiver to receive wireless broadcasts directly from the plurality of conveyor controllers, wherein the plurality of conveyor controllers comprises a plurality of upstream and downstream conveyor controllers and each of the plurality of conveyor controllers signal directly to the receiver of the first conveyor controller; and a multi-zone logic portion to control movement of the first conveyor zone based at least in part on the input from the sensor and the wireless broadcasts from the plurality of conveyor controllers including non-adjacent conveyor controllers, wherein the multi-zone logic portion performs logic determinations based upon the wireless broadcasts received directly from all of upstream and downstream conveyor controllers including wireless broadcasts from non-adjacent conveyor controllers, and wherein the input from the sensor and the directly received wireless broadcasts from all other conveyor controllers include at least a transition to own zone (TTO) state variable and a transition from own zone (TFO) state variable.

13. The first conveyor controller of claim 12, wherein the wireless broadcast relates to the presence of an object within at least a second conveyor zone.

14. The conveyor controller of claim 12, wherein the wireless broadcast comprises a configuration message.

15. The conveyor controller of claim 14, wherein the configuration message relates to a slug mode.

16. The conveyor controller of claim 12, wherein the wireless broadcast relates to a sleep state.

17. The conveyor controller of claim 12, wherein the multi-zone logic portion includes a jam detect function.

18. The conveyor controller of claim 12, wherein the multi-zone logic portion is further configured to determine implied states.

19. A method of configuring a conveyor system, the conveyor system having a plurality of zones, each zone having a zone driver controller to control movement of the zone, the method comprising:

receiving a wireless message having configuration information;

configuring the zone driver controller in accordance with the configuration information;

operating the zone in accordance with the configuration information; and automatically configuring other zone modules via communications with a first zone driver controller, wherein the first zone driver controller signals directly to one or more of at least one of upstream zone driver controllers and downstream zone driver controllers including non-contiguous zone driver controllers;

the configuration information relates to at least one of a slug mode, a sleep mode, a jam mode, a broadcast mode, a delay mode, a timer mode, a counter mode, and a test mode.

20. The method of claim 19, further comprising sending the configuration information to at least a second zone driver controller.

21. A method of operating a conveyor having a plurality of zones, comprising:

receiving a sensor input, the sensor input relating to a presence or an absence of an object in a first zone;

receiving one or more wireless messages conveying a direct state event in at least a first zone and implied state event in at least a second zone, wherein the first zone directly receives at least one direct state event input and at least one implied state event input from at least one of an upstream zone or a downstream zone including at least one non-adjacent zone, and wherein the first zone determines if an online or offline configuration is to be employed; and controlling the movement of the plurality of zones in accordance with the at least one direct state event input and the at least one implied state event input, the direct state event and the implied state event received from the at least one of an upstream zone and a downstream zone including at least one non-adjacent zone.

22. The method of claim 21, the one or more wireless messages conforming to a Bluetooth protocol or a Wireless Markup Language.

23. The method of claim 21, the first zone further deciding and driving an actuator from an associated logic based on states of one or more of one or more preceding or one or more following conveyer zones conveyed to the first zone through the wireless messages.

* * * * *